United States Patent
Short et al.

(10) Patent No.: US 10,740,976 B2
(45) Date of Patent: Aug. 11, 2020

(54) RENDERING VIRTUAL OBJECTS IN 3D ENVIRONMENTS

(71) Applicant: Accenture Global Solutions Limited, Dublin (IE)

(72) Inventors: Matthew Thomas Short, San Jose, CA (US); Sunny Webb, San Francisco, CA (US); Joshua Opel, Flower Mound, TX (US); Theo E. Christensen, Dallas, TX (US)

(73) Assignee: Accenture Global Solutions Limited, Dublin (IE)

( * ) Notice: Subject to any disclaimer, the term of this patent is extended or adjusted under 35 U.S.C. 154(b) by 0 days.

(21) Appl. No.: 16/200,245

(22) Filed: Nov. 26, 2018

(65) Prior Publication Data

US 2019/0172266 A1   Jun. 6, 2019

Related U.S. Application Data

(63) Continuation of application No. 15/422,407, filed on Feb. 1, 2017, now Pat. No. 10,140,773.

(51) Int. Cl.
*G06T 19/00* (2011.01)
*G06T 7/73* (2017.01)
(Continued)

(52) U.S. Cl.
CPC .......... *G06T 19/006* (2013.01); *G02B 27/017* (2013.01); *G06F 3/011* (2013.01);
(Continued)

(58) Field of Classification Search
None
See application file for complete search history.

(56) References Cited

U.S. PATENT DOCUMENTS 9,088,787 B1   7/2015  Smith et al.
2005/0289590 A1*  12/2005  Cheok ................... G06Q 30/02
                                                        725/37
(Continued)

FOREIGN PATENT DOCUMENTS

EP            2400464          12/2011
EP            3214586          9/2017
WO       WO 2009/094643       7/2009

OTHER PUBLICATIONS

Dias et al., "Gesturing with Tangible Interfaces for Mixed Reality", Springer Verlag, 2004. (Year: 2004).*
(Continued)

*Primary Examiner* — Nicholas R Wilson
(74) *Attorney, Agent, or Firm* — Fish & Richardson P.C.

(57) ABSTRACT

Systems, methods, devices, and other techniques for placing and rendering virtual objects in three-dimensional environments. The techniques include providing, by a device, a view of an environment of a first user. A first computing system associated with the first user receives an instruction to display, within the view of the environment of the first user, a virtual marker at a specified position of the environment of the first user, the specified position derived from a second user's interaction with a three-dimensional (3D) model of at least a portion of the environment of the first user. The device displays, within the view of the environment of the first user, the virtual marker at the specified position of the environment of the first user.

18 Claims, 12 Drawing Sheets

(51) Int. Cl.
*G06F 3/0481* (2013.01)
*G06F 3/01* (2006.01)
*G06K 9/00* (2006.01)
*G02B 27/01* (2006.01)

(52) U.S. Cl.
CPC ..... *G06F 3/04815* (2013.01); *G06K 9/00671* (2013.01); *G06T 7/73* (2017.01); *G02B 2027/014* (2013.01); *G02B 2027/0141* (2013.01); *G06T 2207/30204* (2013.01); *G06T 2210/62* (2013.01); *G06T 2219/004* (2013.01); *G06T 2219/024* (2013.01)

(56) References Cited

U.S. PATENT DOCUMENTS

| | | |
|---|---|---|
| 2010/0238161 A1 | 9/2010 | Varga et al. |
| 2011/0115816 A1 | 5/2011 | Brackney et al. |
| 2013/0083063 A1 | 4/2013 | Geisner et al. |
| 2014/0282105 A1 | 9/2014 | Nordstrom |
| 2015/0265922 A1* | 9/2015 | Yamane ............ A63F 13/525 463/31 |
| 2016/0260261 A1 | 9/2016 | Hsu et al. |
| 2016/0292925 A1 | 10/2016 | Montgomerie et al. |
| 2016/0358383 A1 | 12/2016 | Gauglitz et al. |
| 2017/0076491 A1 | 3/2017 | Jiang et al. |

OTHER PUBLICATIONS

'en.wikipedia.org' [online]. "Meta (company)," Sep. 8, 2015, [retrieved on Sep. 18, 2017]. Retrieved from the Internet: URL < https://en.wikipedia.org/wiki/Meta_(company) > 4 pages.

'en.wikipedia.org' [online]. "Tango (platform)," Sep. 23, 2016, [retrieved on Sep. 18, 2017]. Retrieved from the Internet: URL< https://en.wikipedia.org/wiki/Tango_(platform) >, 6 pages.

'www.engadget' [online]. "Meta's new AR headset lets you treat virtual objects like real ones," Mar. 2, 2016, [retrieved on Sep. 18, 2017]. Retrieved from the Internet: URL < https://www.engadget.com/2016/03/02/meta-2-augmented-reality-headset-hands-on/ > 7 pages.

'www.fastcompany.com' [online]. "With Hololens, Microsoft is Learning from Google Glass's Failure," Sep. 16, 2016, [retrieved on 099-18/2017]. Retrieved from the Internet: URL < https://www.fastcompany.com/3063825/with-hololens-microsoft-is-learning-from-google-glasss-failure >, 18 pages.

'www.marxentlabs.com' [online]. "Project Tango: 3 ways Google's new Augmented Reality platform is an upgrade for businesses," Jun. 29, 2016, [retrieved on Sep. 18, 2017]. Retrieved from the Internet: URL< https://www.marxentlabs.com/project-tango-3-ways-googles-augmented-reality-platform-upgrade-businesses-marxent/ > 10 pages.

'www.roadandtrack.com' [online]. "Microsoft HoloLens fundamentally changes vehicle design and repair," Jan. 22, 2015, [retrieved on Sep. 18, 2017]. Retrieved from the Internet: URL< http://www.roadandtrack.com/car-culture/car-design/news/a24819/microsoft-hololens-could-change-vehicle-design-and-repair/ > 7 pages.

'www.slashgear.com' [online]. "This is how the 3D tech in Google's Project Tango works," Jun. 5, 2014, [retrieved on Sep. 18, 2017]. Retrieved from the Internet: URL < https://www.slashgear.com/this-is-how-the-3d-tech-in-googles-project-tango-works-05332309/ >, 8 pages.

'www.theguardian.com' [online]. "HoloLens: the virtual reality headset for elevator repair," Sep. 19, 2016, [retrieved on Sep. 18, 2017]. Retrieved from the Internet: URL< https://www.theguardian.com/business/2016/sep/19/hololens-the-virtual-reality-headset-for-elevator-repair > 3 pages.

European Search Report issued in EP 18151501, dated Jun. 6, 2018, 14 pages.

Microsoft HoloLens, "Not Just Another VR Headset," Digital Living, 2015, 4 pages.

* cited by examiner

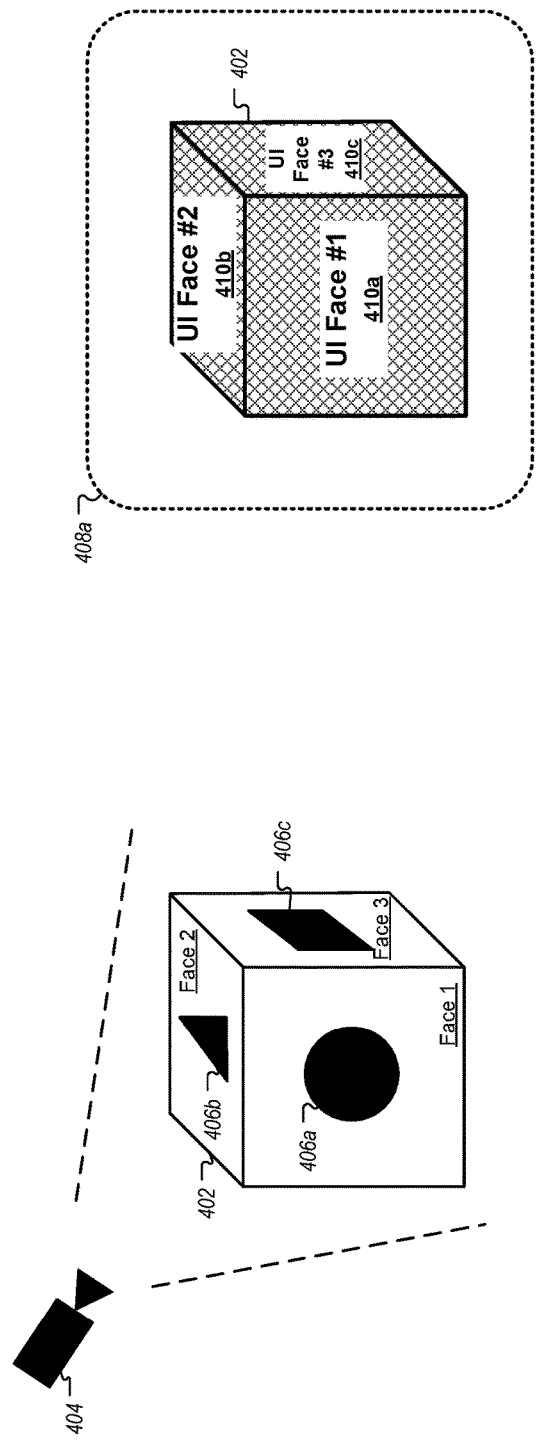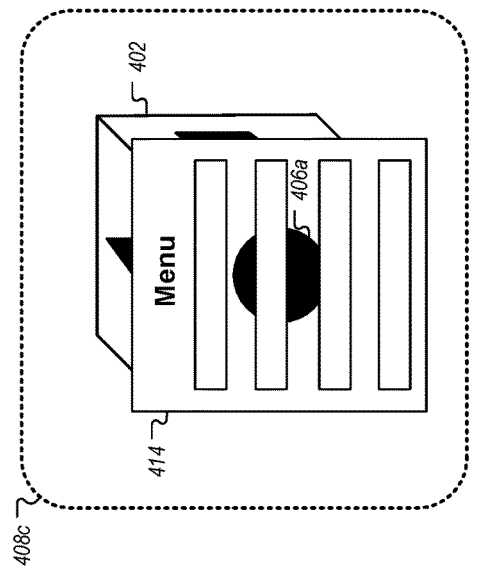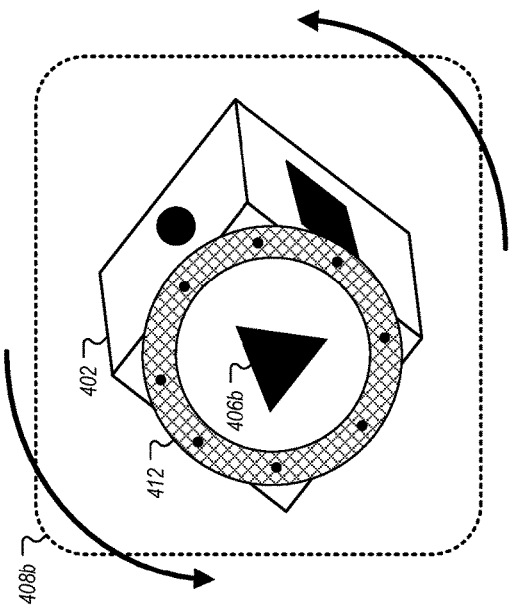
FIG. 4B
FIG. 4D
FIG. 4A
FIG. 4C

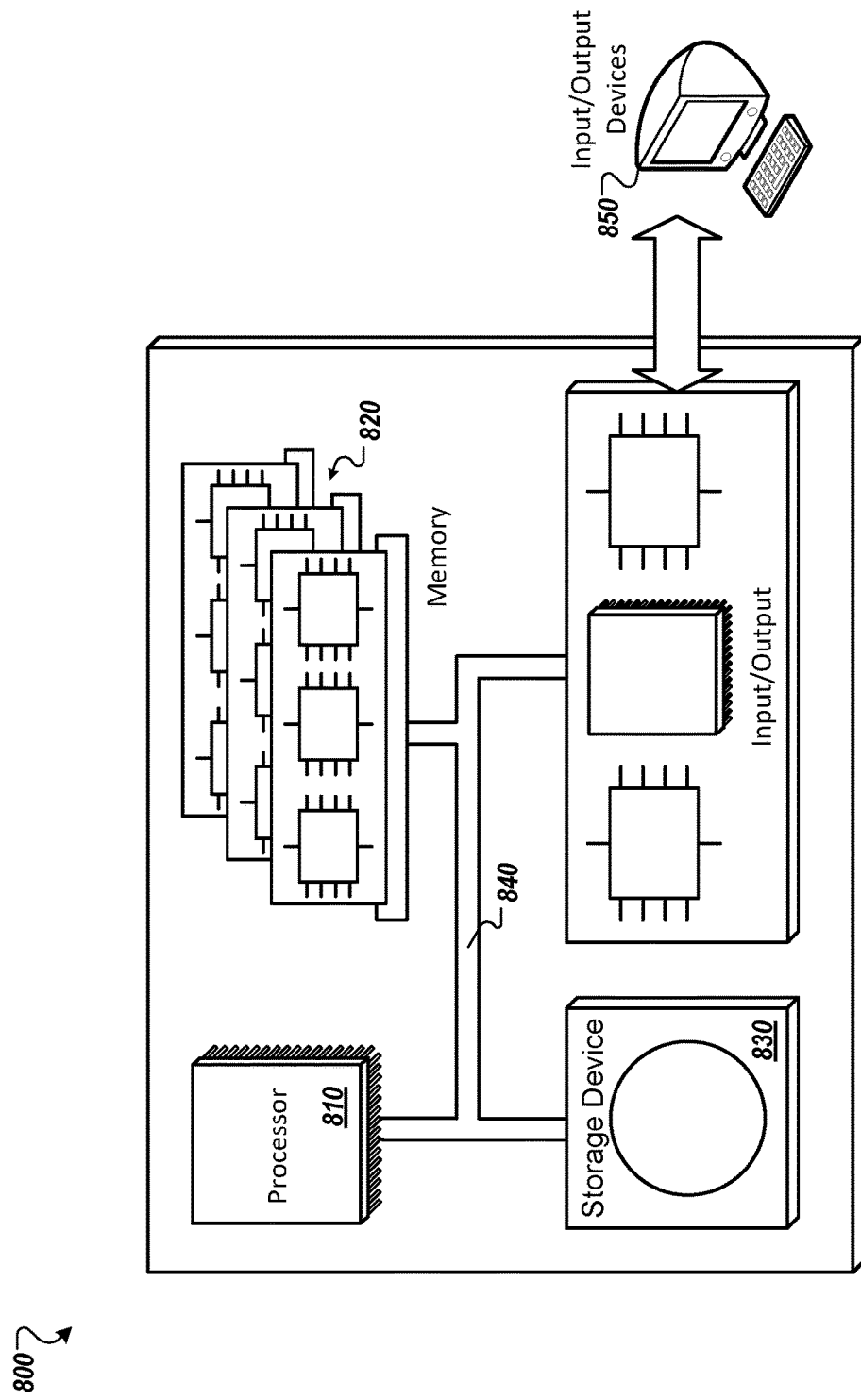

RENDERING VIRTUAL OBJECTS IN 3D ENVIRONMENTS

CROSS-REFERENCE TO RELATED APPLICATION

This application is a continuation (and claims the benefit of priority under 35 U.S.C. § 120) of U.S. application Ser. No. 15/422,407, filed Feb. 1, 2017, which is hereby incorporated by reference in its entirety.

BACKGROUND

This specification generally relates to computer-based techniques for placing and rendering virtual objects in three-dimensional (3D) environments.

Various computing systems have been developed that render 3D environments. By way of example, virtual reality (VR) systems render a 3D environment that can be presented to a user wearing a head-mounted display. The head-mounted display may include an electronic display screen and optical lenses through which the user views the screen and the displayed 3D environment. The system can render the 3D environment stereoscopically on the screen, which creates the illusion of depth to a user when viewed through the lenses of the head-mounted display. Some VR systems provide an immersive user experience so the user feels as if he or she is actually present in the virtual environment. Some VR systems allow a user to look or move around the 3D environment, and to manipulate virtual objects within the 3D environment.

As another example, augmented reality systems have been developed that augment views of a real-world environment with virtual objects. The virtual objects can be formatted so that they appear as if they are part of the real-world environment, such as a virtual robot that appears in live video of a laboratory setting or a virtual pet that appears in live video of a residence. Some augmented reality systems are mixed reality systems, which augment direct real-world views of an environment with virtual objects that appear as if they are located in the environment. A direct real-world view of the environment may be seen through fully or semi-transparent lenses of a head-mounted display device, for example, in contrast to a video feed of the environment that provides an indirect view.

SUMMARY

This specification describes, among other things, techniques for placing and rendering virtual objects in a 3D environment. Computing systems configured according to the techniques disclosed herein may allow remotely located users to coordinate tasks that involve physical interaction with objects in the environment of one of the users. By way of example, a first user may be a field worker performing diagnostic, maintenance, or repair work on a target device in the field worker's environment, and a second user may have expertise in working on such devices but is not physically present with the first user. The system may present a 3D model of the target device to the second user, who can then interact with the model and add virtual markers on or near the model to identify locations where the first user should perform some action to further the diagnostic, maintenance, or repair work. The system may then render virtual markers for the field worker in a real-world view of the field worker's environment. For instance, the system may render the virtual markers by augmenting the field worker's real-world view of the environment using a mixed-reality head-mounted display device. Thus, as the user physically works on the target device, the virtual markers appear as if they are actually located at fixed points in space or are located on the target device in the field worker's environment.

Some implementations of the subject matter disclosed herein include a computer-implemented method. The method can include providing, by a device, a view of an environment of a first user. A first computing system associated with the first user receives an instruction to display, within the view of the environment of the first user, a virtual marker at a specified position of the environment of the first user, the specified position derived from a second user's interaction with a three-dimensional (3D) model of at least a portion of the environment of the first user. The device displays, within the view of the environment of the first user, the virtual marker at the specified position of the environment of the first user.

These and other implementations can optionally include one or more of the following features.

The instruction to display the virtual marker at the specified position of the environment of the first user can include a coordinate value that identifies the position of the virtual marker in a 3D space. The coordinate value can identify the position of the virtual marker in a 3D space of a second environment other than the environment of the first user. The system can further map the coordinate from the 3D space of the second environment to the 3D space of the environment of the first user to determine a corresponding position of the virtual marker in the environment of the first user. The coordinate value can identify the position of the virtual marker in the 3D space of the second environment using a first 3D offset from one or more anchor points of the second environment. Mapping the coordinate from the 3D space of the second environment to the 3D space of the environment of the first user can include (1) identifying one or more anchor points of the environment of the first user, and (2) applying, using the coordinate value, a second 3D offset from the one or more anchor points of the environment of the first user to identify the corresponding position of the virtual marker in the environment of the first user.

Displaying the virtual marker at the specified position of the environment of the first user can include superimposing the virtual marker over the view of the environment of the first user so that the virtual marker visually appears as if it is located a distance from the first user at the specified position of the environment.

The second user's interaction with the 3D model of the at least the portion of the environment of the first user can occur while the second user is remotely located from the environment of the first user.

The 3D model of the at least the portion of the environment of the first user can include a 3D model of a target object located in the environment of the first user. The second user's interaction with the 3D model of the at least the portion of the environment can include placing the virtual marker at a particular location on a surface of the 3D model of the target object. Displaying the virtual marker at the specified position of the environment of the first user can include displaying the virtual marker at a corresponding location on a surface of the target object within the view of the environment of the first user.

The first computing system can obtain, from one or more spatial sensors, spatial sensing data that indicates spatial characteristics of the environment of the first user. Based on the spatial sensing data, the first computing system can generate the 3D model of the at least the portion of the environment of the first user.

The first computing system can analyze the 3D model of the at least the portion of the environment of the first user to identify a virtual object in the 3D model of the at least the portion of the environment of the first user that represents a target object located in the environment of the first user. The system can generate a 3D model of the target object by extracting the identified virtual object from the 3D model of the at least the portion of the environment of the first user. The second user can specify the position of the virtual marker by placing the virtual marker at a particular location in a virtual environment that includes the 3D model of the target object.

The device can be a head-mounted display (HMD) device, wherein the HMD device displays the virtual marker at the specified position of the environment of the first user while the first user is wearing the HMD device.

Providing the view of the environment of the first user can include generating an augmented view of the environment that shows one or more virtual objects at fixed positions in a 3D space of the environment.

Some implementations of the subject matter disclosed herein include a computer-implemented method. The method can include receiving, by a computing system, data that represents a 3D model of at least a portion of an environment of a first user; rendering, by the computing system for display to a second user, the 3D model of the at least the portion of the environment of the first user; identifying, by the computing system, that a user input placed a virtual marker at a specified position of a virtual environment that includes the 3D model of the at least the portion of the environment of the first user; and transmitting, by the computing system, an instruction for the virtual marker to be displayed within a view of the environment of the first user at a specified position of the environment of the first user that corresponds to the specified position of the virtual environment at which the user input placed the virtual marker.

These and other implementations can optionally include one or more of the following features. Rendering the 3D model of the at least the portion of the environment of the first user can include augmenting a direct real-world view of a second environment of a second user with the 3D model of the at least the portion of the environment of the first user.

A head-mounted display (HMD) device can be used to augment the direct real-world view of the second environment of the second user with the 3D model of the at least the portion of the environment of the first user.

A portable computing device or a 3D-display device can be used to render the 3D model of the at least the portion of the environment of the first user.

The 3D model of the at least the portion of the environment of the first user can include a virtual object that represents a target object that is located in the environment of the first user. The system generates a 3D model of the target object from the 3D model of the at least the portion of the environment of the first user. Identifying that the user input placed the virtual marker at the specified position of the virtual environment can include identifying that the user input placed the virtual marker at a particular location on a surface of the 3D model of the target object.

After transmitting the instruction for the virtual marker to be displayed within the view of the environment of the first user, the system can perform further operations that include: receiving data that identifies a position in the environment of the first user at which a physical implement has been brought into contact with or proximity of the target object; and rendering, by the computing system and for display to the second user within the virtual environment, a virtual marker that represents the physical implement at a position relative to the 3D model of the target object that corresponds to the position in the environment of the first user at which the physical implement was brought into contact with or proximity of the target object.

The system can perform further operations that include displaying the virtual marker that represents the physical implement concurrently with the placed virtual marker, and receiving a second user input that indicates whether the physical implement was properly positioned with respect to the target object, wherein in response to identifying that the second user input indicates that the physical implement was not properly positioned with respect to the target object, the computing system is configured to transmit a notification to a computing system associated with the first user.

The 3D model of the at least the portion of the environment of the first user can include a 3D model of a target object located in the environment of the first user. The system can perform further operations that include receiving sensor data that identifies values for one or more operational parameters of the target object, and rendering, for display to the second user along with the 3D model of the target object, user interface elements representing the values for the one or more operational parameters of the target object.

Additional implementations of the subject matter disclosed herein include one or more computer-readable media encoded with instructions that, when executed by one or more processors, cause the one or more processors to perform any of the methods/processes disclosed herein. The computer-readable media may further be part of a computing system that includes the one or more processors.

Some implementations of the subject matter described herein may, in certain instances, achieve one or more of the following advantages. First, the system may facilitate improved communication between a first user and a remotely located second user. For example, the first user may be a field user performing diagnostics, repairs, or maintenance on a device in the first user's environment. If the second user has expertise with respect to the device, the second user may provide remote assistance to the first user by precisely placing virtual markers at particular locations in a virtual environment relative to a 3D model of the device. By providing a 3D model of the device in the first user's environment, the second user may more easily and accurately place virtual markers on or near specific locations of the device than what otherwise may be feasible if the second user interacted with a two-dimensional representation of the device such as images or a video stream of the first user's environment. Second, by augmenting a real-world view of the first user's environment with virtual markers placed by the second user, the first user may more readily visualize the precise location of the virtual marker in three dimensions of the real-world environment. Third, by affording more accurate placement and visualization of virtual markers in 3D environments, the number of required transmissions between a field computing system and a remote computing system may be reduced due to better initial placement of the markers. Fourth, the amount of data required to identify a coordinate and, optionally, an orientation for a virtual marker may be relatively small as compared to some techniques for communicating positional information by voice or video. Accordingly, the use of virtual markers to convey positional information between remotely located users may reduce communication latency and conserve channel bandwidth. Fifth, by extracting target objects or portions of a 3D model of an environment, the file size for the transmitted model may be reduced thereby conserving channel bandwidth and reducing transmission times. Sixth, a gaze-activated user interface element that is maintained in a collapsed state may allow detailed information to be made available to a user based on a direction of the user's gaze while preserving the ability of a user to inspect a real-world view of an environment with minimal distractions.

Additional features and advantages will be apparent from the description, the claims, and the drawings to one of ordinary skill in the art.

DESCRIPTION OF DRAWINGS

FIGS. 4A-4D illustrate a physical control object that can be employed in augmented and mixed reality systems to provide efficient access to user interface elements that are superimposed in a view of a real-world environment.

FIG. 8 is a schematic diagram of a computer system, which can be used to carry out the operations described in association with the computer-implemented methods, systems, devices, and other techniques described herein.

Like reference numbers and designations among the various drawings indicate like elements.

DETAILED DESCRIPTION

FIGS. 1A-1F illustrate stages of an example process by which a remote modeling system enables communications between a field user 102 and an expert user (not shown) who are located remotely from each other. The field user 102 is located in a field environment in which the field user 102 can physically interact with one or more target objects that exist in the field environment. In the example of FIGS. 1A-1F, the target object is a furnace system 104. For instance, the field user 102 may be an HVAC technician performing repair or maintenance work on the furnace system 104 in a basement or other mechanical room of a building. During the course of the repair or maintenance work, the field user 102 may wish to consult with another user, e.g., a user who has expertise with the particular model of the furnace system 104, a supervisor who performs a remote quality check on the field user's work, or a homeowner who is away during the repair or maintenance work. For the purpose of this example, the second user that the field user 102 communicates with via the remote modeling system is referred to as an expert user.

Figure 1B:
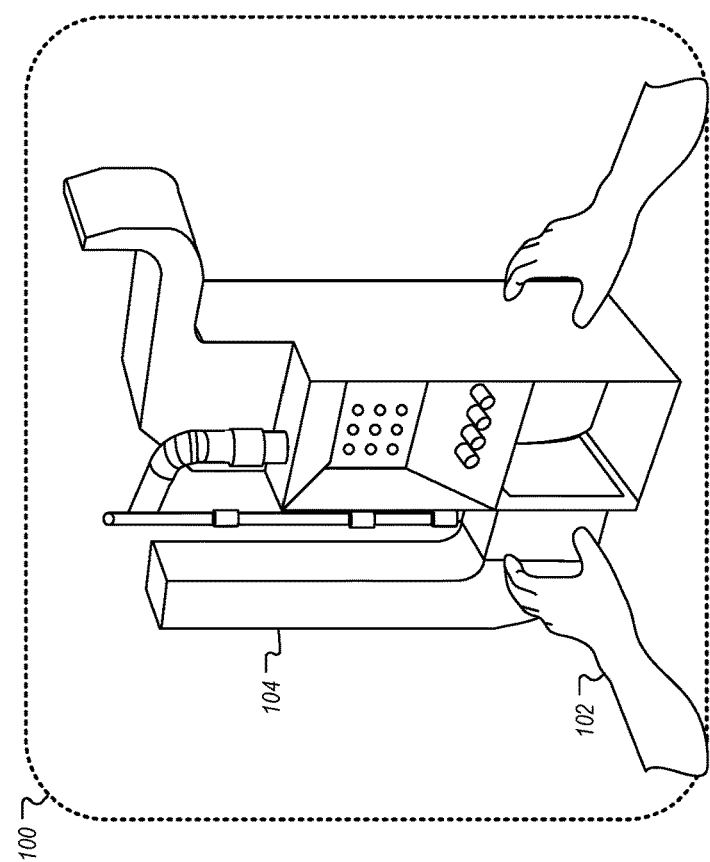
FIGS. 1A-1F illustrate an example conceptual process by which a field worker communicates with a remote expert to perform maintenance or repairs on a furnace located in the field worker's environment. A system facilitates the ability of the remote expert to convey precise information to the field worker for certain repair or maintenance tasks.
Figure 1A:
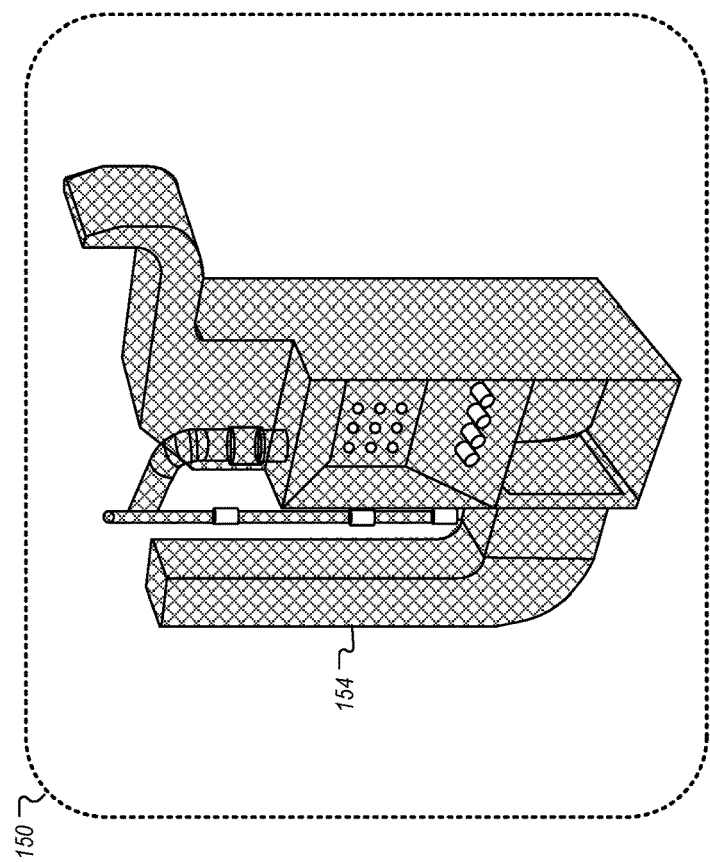
Figure 1D:
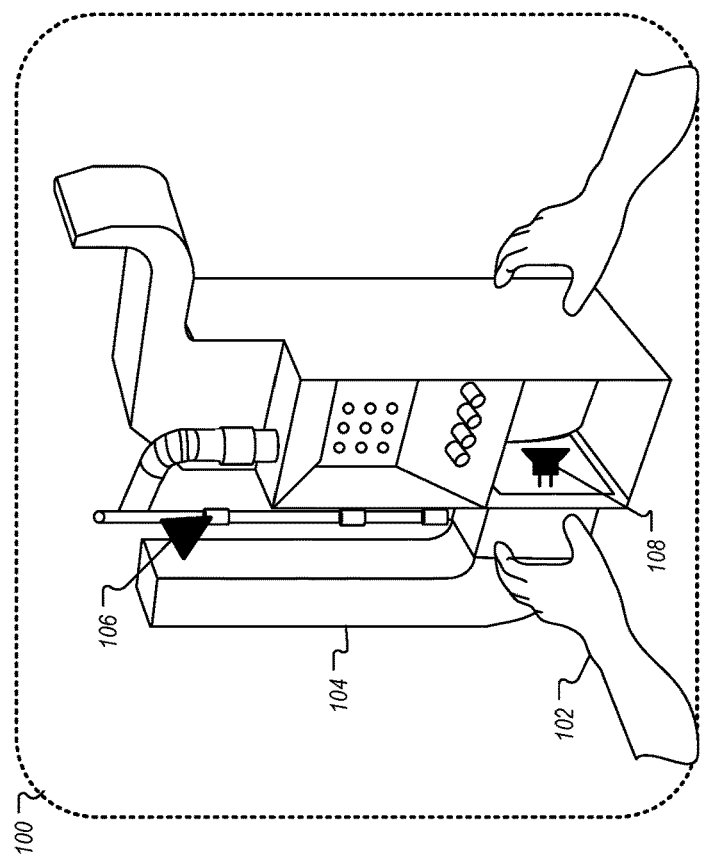

Beginning at FIG. 1A, the field user 102 deploys a field-based portion of the remote modeling system, e.g., field system 202, to perform spatial modeling of the field user's ambient environment. The system may include a spatial modeling engine that uses data obtained from a spatial sensing subsystem to generate a 3D model of the field user's surrounding environment, or a specified portion thereof. The spatial sensing subsystem may include, for example, an infrared emitter that emits a pattern of infrared light in the field environment and a depth camera that detects distortions in the infrared patterns projected onto surfaces of the environment to determine distances of the surfaces from the camera. The spatial modeling engine can use the data sensed by the depth camera to generate a 3D model of the environment. In some instances, the field user 102 may aim the spatial sensing subsystem at a target object, e.g., furnace system 104, in the environment and may walk around the target object to scan the object from different angles in order to generate a complete 3D model of the target object within the field user's ambient environment.

The field user 102 uses a display device to view the target object and other aspects of the environment. FIG. 1A shows a view 100 of the ambient environment of the field user 102 with particular focus on furnace system 104. The view 100 may be provided by the display device, which in some implementations is a head-mounted display (HMD). With the HMD, the field user 102 is enabled to don the device on his or her head and be immersed in the view 100 of the ambient environment.

In some implementations, the view 100 is a real-world view of the ambient environment in which the ambient environment is shown directly, e.g., through lenses of the HMD, or is shown indirectly, e.g., on an opaque display screen that shows live images or videos of the ambient environment in the field of view of a camera. For a direct real-world view, the HMD may be a mixed-reality display that allows a user to view the ambient environment through at least partially transparent lenses while also augmenting the view with virtual objects rendered over the lenses such that the virtual objects appear as if they are located within the ambient environment itself. An example mixed-reality HMD is the MICROSOFT® HOLOLENS®. For an indirect real-world view, the HMD may be a virtual reality device that includes a near-eye display (e.g., an LCD or LED display) and which shows a 3D video of the ambient environment of the field user 102. In other implementations, an indirect real-world view of the ambient environment of the field user 102 may be provided on desktop monitors, televisions, or portable displays that are not worn by the user 102 and not necessarily designed for immersive, near-eye viewing. For the purpose of discussion, the real-world view 100 described in the example of FIGS. 1A-1F is assumed to be a direct real-world view provided by a mixed-reality HMD.

After the spatial modeling engine has generated a 3D model of the ambient environment of the field user 102, the system transmits data representing a 3D model of at least a portion of the ambient environment to a remote system. In some implementations, the transmitted 3D model is the complete model of the ambient environment as generated by the spatial modeling engine. In other implementations, the transmitted 3D model may represent less than all of the ambient environment. For example, the system may identify the furnace system 104 as the target object in the field user's environment. Based on identifying the furnace system 104 as the target object, the system may extract the portion of the 3D model that corresponds to just the furnace system 104 from the 3D model of the ambient environment as a whole (e.g., to the exclusion of surroundings that are not pertinent to the furnace system 104) to generate a 3D model of the furnace system. The field computing system can then transmit the 3D model of the furnace to a remote portion of the modeling system that is associated with the expert user, e.g., remote system 204.

FIG. 1B is a view 150 of a rendered 3D model 154 of the furnace system 104 from the ambient environment of the field user. The remote computing system generates the view 150 for the expert user, who is providing remote assistance to the field user 102 with respect to the repair or maintenance task on the furnace 104. The system can present the 3D furnace model 154 to the expert user in various ways. In some implementations, the expert user uses a mixed-reality HMD to display the virtual field environment so that the 3D furnace model 154 is rendered as a virtual object that augments a direct real-world view 150 of the expert user's ambient environment. For example, the expert user may work in a lab or a shop, which can be seen through the transparent lenses of the mixed-reality HMD. Upon receiving the 3D furnace model 154 from the field computing system, the expert user's mixed-reality HMD may augment the expert user's view 150 with a virtual rendering of the furnace using the 3D furnace model 154. The 3D furnace model 154 may be virtually located in the view 150 of the expert user's environment in a natural position, e.g., set on a floor at a fixed location of the environment. While wearing the mixed-reality HMD, the expert user may physically move around the virtual rendering of the furnace 104 to view and inspect the target object from various angles. In other implementations, the remote modeling system may render the 3D furnace model 154 for the expert user using other types of displays. For example, the system may render the 3D furnace model 154 in a user interface on the screen of a tablet computing device, on a desktop monitor, or a television monitor. In some instances, the 3D furnace model 154 may be rendered on a 3D monitor that employs a stereoscopic display to give the perception of depth to the model 154.

The remote modeling system is configured to allow the expert user to interact with the 3D model of the target object. The expert user may "annotate" the 3D model of the target object in a virtual field environment by adding virtual markers to the environment in which the 3D model of the target object is rendered.

Figure 1C:
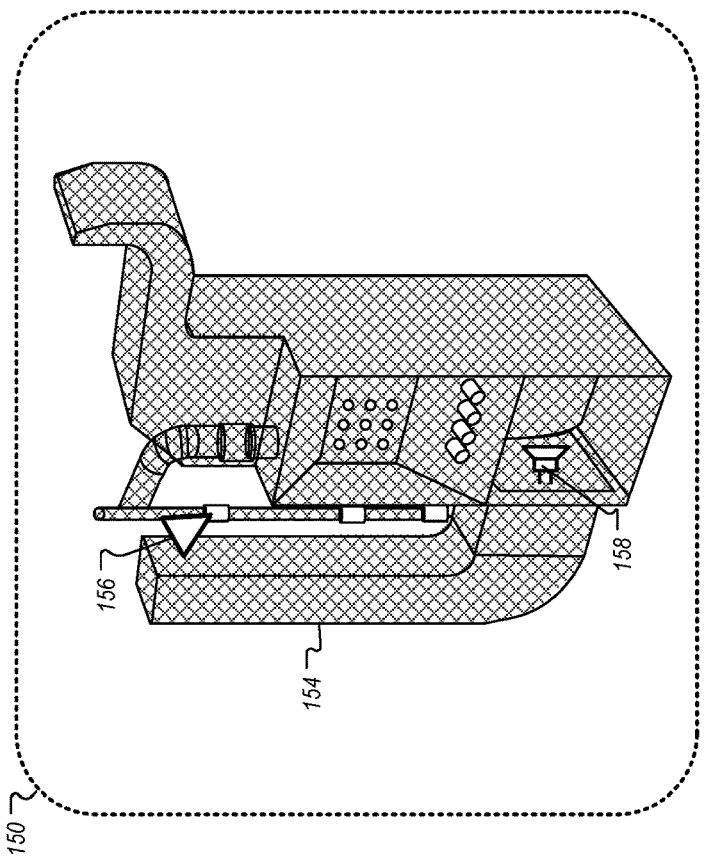
Figure 1F:
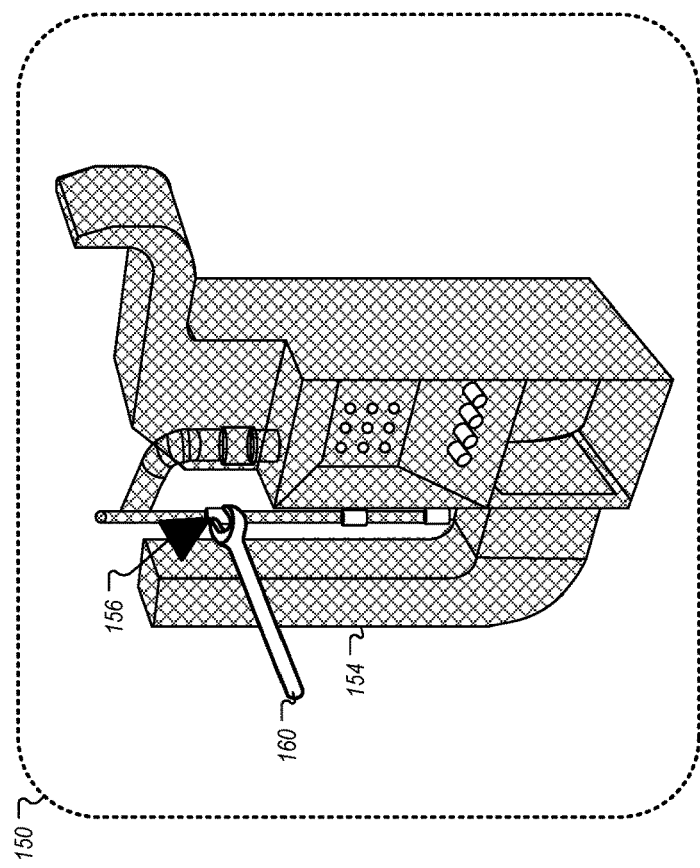

Virtual markers are generally virtual objects that augment a view of a 3D environment and that identify particular locations in the 3D environment specified by a user. As shown in FIG. 1C, for example, the expert user has added a virtual marker 156 proximate to a coupling on a gas pipe of the 3D model of the furnace 104 from the ambient environment of the field user 102. The expert user may specify precisely where the virtual marker should be placed in the 3D environment so as to accurately convey location (position) information to the field user 102. Thus, if the expert user suspects that a leak or other problem may exist with the top coupling on the gas pipe of the furnace, the virtual marker can be placed on or near that coupling. The location of a virtual marker 156 can be specified in any suitable way according to the manner in which the 3D model 154 is presented. For implementations in which the 3D model 154 is displayed on a tablet, the expert user may use touchscreen gestures to rotate, pan, or zoom the 3D model 154 and to drag a virtual marker to a desired location. For implementations in which the 3D model 154 is displayed with an HMD device in a mixed-reality environment or a virtual reality environment, the expert user may use hand gestures or a pointing device to indicate in 3D space the desired location of the virtual marker.

In some implementations, a virtual marker can present additional information beyond just location or positional information. To convey additional information to the field user 102, the expert user may, for instance, specify an orientation of the virtual marker, assign a particular appearance (e.g., a selected 3D model) to the virtual marker, animate the virtual marker, add media content to the virtual marker, or add a note or other text to the virtual marker. For example, the expert user may suggest a particular tool (implement) for the field user 102 to use when working on the pipe coupling by selecting a 3D model for that tool. Similarly, the field user 102 may add a short note next to the selected 3D model indicating instructions for using the tool. In some implementations, the system may automatically select an icon for a virtual marker that matches a type of supplemental content added to a virtual marker. For example, a second virtual marker 158 shown in FIG. 1C includes audio content. The system therefore uses a speaker icon to alert the field user 102 that audio content can be played from the virtual marker, such as a recording of verbal instructions from the expert user.

After the expert user confirms the placement of one or more virtual markers in the 3D environment on or around the 3D model of the target object, the remote modeling system transmits data representing the virtual markers to the field portion of the system. The field portion of the system can then process the received data representing the virtual markers placed by the expert user to render the virtual objects in the view 100 of the ambient environment of the field user 102. For example, in FIG. 1D, a first virtual marker 106 corresponding to virtual marker 156 is rendered on or near the furnace pipe's top coupling in a location that corresponds to the location of the virtual marker 156 relative to the 3D model of the furnace 104. Likewise, a second virtual marker 108 corresponding to virtual marker 158 is rendered near the base of the furnace at a location that corresponds to the location of the virtual marker 158 relative to the 3D model of the furnace 104. For implementations in which the view 100 is a direct real-world view of the ambient environment generated by a mixed-reality HMD device, the field user 102 can thereby see the precise location of the virtual markers 106, 108 in 3D space on or near the actual furnace system 104. Moreover, the virtual markers 106, 108 may be fixed in space so that, even as the field user 102 looks or moves around his or her environment, the virtual markers may remain fixed in space, e.g., at the top-most pipe coupling and at the base of the furnace 104, respectively.

Figure 1E:
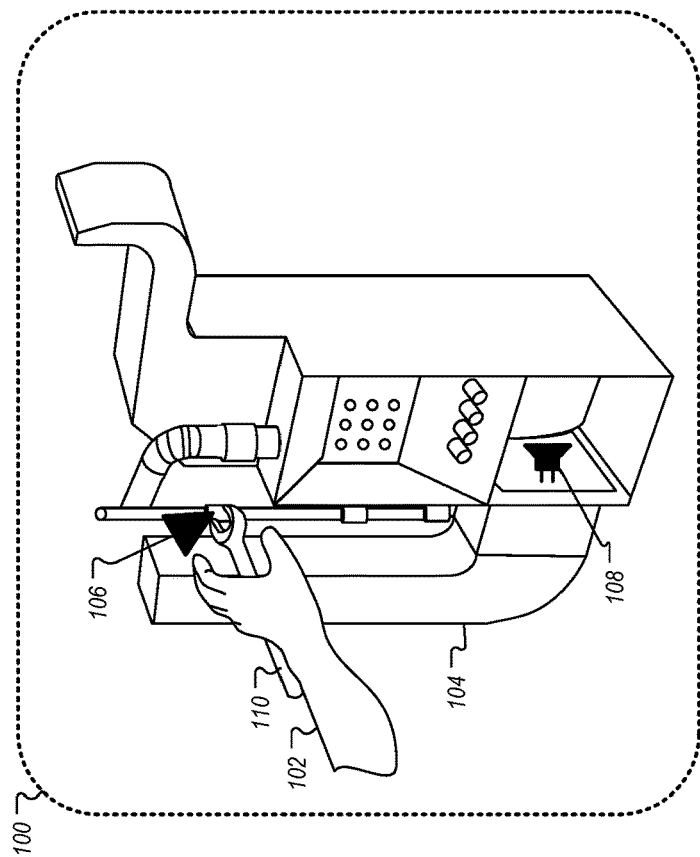

In some instances, the field user 102 can use a virtual marker 106 that is displayed within a view 100 of the ambient environment as a guide for performing an action in the environment. For example, the expert user may have placed the virtual marker 106 in the environment as an indication to the field user 102 of the precise location on the target object where the field user 102 should apply a tool. As FIG. 1E shows, the virtual marker 106 appears on or near the top-most pipe coupling of the furnace system 104. Upon seeing the virtual marker 106 in the view 100, the field user 102 knows that he or she should torque the identified pipe coupling using wrench 110. In some implementations, as the field user 102 torques the identified pipe coupling using an appropriate wrench 110, the field-portion of the remote modeling system captures the location and, optionally, the orientation of the wrench 110 during the work. The captured data characterizing the field user's use of the wrench 110 is transferred to the remote portion of the computing system for the expert user. A virtual representation 160 of the wrench 110 can then be rendered within the view 150 for the expert user at a location relative to the 3D furnace model 154 that corresponds to the location at which the field user 102 physically applied the wrench 110 to the actual furnace system 104. In some implementations, the virtual representation 160 of the wrench 110 can be a 3D model of the wrench 110 that visually resembles the tool used by the field user 102. In some implementations, the virtual representation 160 of the wrench 110 can be displayed concurrently with the virtual marker 156 that the expert user had previously placed in the view of the furnace system 104. The expert user can then compare in a remote, 3D environment the location that the wrench 110 was applied to the location of the virtual marker 156. If the location of the wrench 110, as indicated by virtual representation 160, is satisfactory to the expert user, the expert user may send a confirmation message to the field user 102. If the location at which the wrench 110 was applied is deemed unsatisfactory, the expert user may adjust the location of the virtual marker 156 and the updated location can be transmitted to the field user 102 to cause the location of the corresponding virtual marker 106 to be moved according to the updated location.

Figure 2:
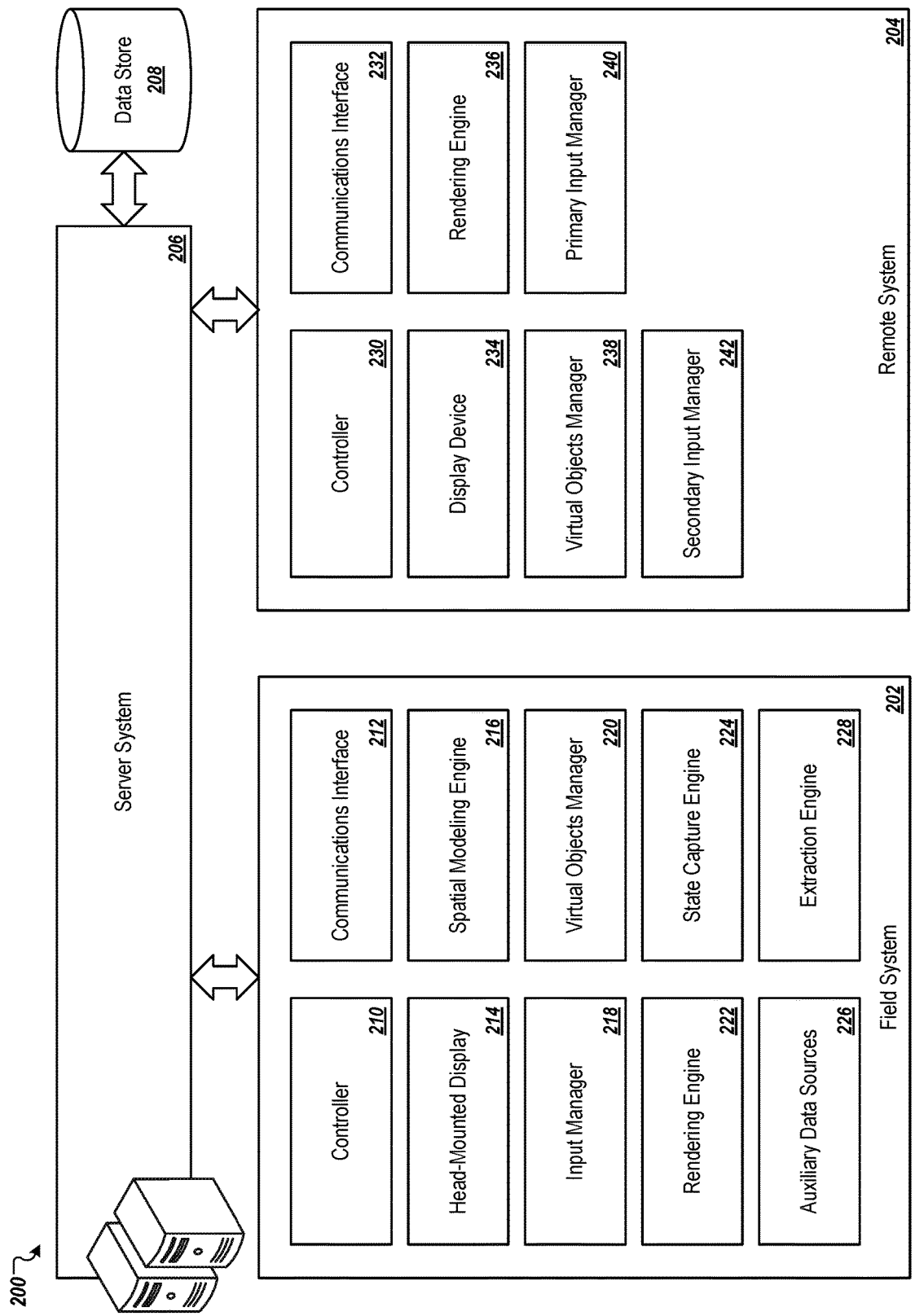
FIG. 2 is a block diagram of an example remote modeling system that renders remote environments and augments the environments with virtual objects.

FIG. 2 is a block diagram of an example remote modeling system 200. The remote modeling system 200 can include multiple computers in multiple locations. In some implementations, the system 200 is configured to carry out the processes disclosed herein, including the processes described with respect to FIGS. 1A-1F and 3A-3C. In general, the system 200 includes two or more portions that are remotely located from each other. These portions include a field system 202 that is deployed in a field environment and a remote system 204 that is remote from the field environment. The field system 202 and the remote system 204 may communicate directly or indirectly over one or more networks, e.g., a local area network or the Internet. In some implementations, the field system 202 and the remote system 204 communicate indirectly via a server system 206. The server system 206 may then pass messages between the field system 202 and the remote system 204. In some implementations, one or more of the components 210-228 that are shown in FIG. 2 as being part of the field system 202, or the components 230-240 that are shown in FIG. 2 as being part of the remote system 204, may alternatively be arranged as part of the server system 206 for non-local (e.g., cloud-based) processing. Each of the components 210-228 and components 230-240 may include one or more dedicated or shared processors.

The field system 202 includes a collection of components 210-228 that provide respective services to a user in the field environment. The controller 210 is responsible for managing operations of the field system 202 and coordinating activities among the various other components 212-228 of the field system 202. The communications interface 212 is configured to transmit and receive messages over one or more networks. The communications interface 212 allows the field system 202 to communicate with the remote system 204, the server system 206, or both.

A head-mounted display (HMD) 214 is a display device that is configured to be worn on the head of a user. The HMD 214 can include an electronic display screen, lenses, or both, located a short distance (e.g., 1-5 inches) in front of the eyes of a user wearing the HMD 214 to present visual content to the user. In some implementations, the HMD 214 is a virtual reality device or a mixed-reality device. In some implementations, the HMD 214 is a mixed-reality device that augments a direct real-world view of an ambient environment of the user. For example, the HMD 214 may include one or more at least partially transparent lenses that allow the user to directly view the real-world environment surrounding the user. The HMD 214 may superimpose virtual objects over portions of the direct real-world view of the environment so that the virtual objects appear to the user as if they are actually present in the environment. One example of a suitable HMD 214 that can augment a direct, real-world view of an ambient environment is a MICROSOFT® HOLOLENS®.

In other implementations, the field system 202 may utilize display devices other than head-mounted displays. For example, an indirect real-world view of the ambient environment, such as a video stream, may be presented on an electronic display screen on a desktop monitor (e.g., an LCD or LED display), a television, a mobile phone, or a tablet computing device.

The field system 202 further includes a spatial modeling engine 216. The spatial modeling engine 216 is configured to generate a 3D model of the ambient environment of the field user. The spatial modeling engine 216 receives spatial sensing data sensed by one or sensors in a spatial sensing subsystem of the spatial modeling engine 216 and processes the spatial sensing data to generate the 3D model. The spatial sensing data represents spatial characteristics of the field user's ambient environment. In some implementations, the spatial sensing data includes data generated as a result of an infrared emitter that emits a pattern of infrared light in the field environment and a depth camera that detects distortions in the infrared patterns projected onto surfaces of the environment to determine distances of the surfaces from the camera. The spatial modeling engine 216 can use the data sensed by the depth camera to generate the 3D model of the environment. In some implementations, other forms of computer vision technologies may be used in addition, or alternatively, to the emitter-depth camera approach. For example, the spatial modeling engine 216 may be configured to analyze images, video, or other spatial sensing data to recognize particular objects in an environment. The spatial modeling engine 216 may then obtain pre-defined 3D models of the recognized objects in the environment and arrange them as the corresponding physical objects are arranged in the environment. The 3D model generated by the spatial modeling engine 216 can be defined in any suitable form, e.g., as a 3D polygonal mesh.

The spatial modeling engine 216 may scan all or a portion of the ambient environment of the field user. However, the resulting 3D model that the spatial modeling engine 216 generates may include extraneous portions that are not required or desired by a remote expert user. For instance, the field user may be attempting to repair a photocopying machine in an office mail room. The remote expert can assist the field user with his or her repair work by interacting with a 3D model of the photocopying machine in a remote environment. The initial 3D model output by the spatial modeling engine 216 may represent the office mail room environment in whole or in part, but may include extraneous aspects of the environment not limited to just the target object, i.e., the photocopying machine. To remove the extraneous aspects of the 3D model of the environment, the remote modeling system can include an extraction engine 228. In general, the extraction engine 228 is configured to identify a target portion of a 3D model and to extract the target portion of the 3D model from extraneous portions of the 3D model. The target portion of the 3D model can be one or more target objects that are to be virtually rendered in the remote user's environment and the extraneous portions of the 3D model can be the remainder of the 3D model other than the target portion. For example, the extraction engine 228 may analyze the initial 3D model of the mail room environment, identify the photocopying machine from the initial 3D model, and extract a 3D model of the photocopying machine from the initial model by discarding extraneous portions of the 3D model that are not part of the photocopying machine.

The extraction engine 228 can identify a target object in a 3D model automatically or based on user input. For automatic identification, the extraction engine 228 may use object detection and recognition techniques to detect a target object in the initial 3D model from the spatial modeling engine 216. For identification based on user input, the extraction engine 228 can receive a user input that indicates a selection of a point or a region in a representation of the modeled 3D environment that corresponds to the target object. The extraction engine 228 can then correlate the selection with a target object and extract a 3D model of the target object from the initial 3D model of the environment. The representation of the modeled 3D environment may be a rendering of the 3D model of the environment, an image of the environment, or may take other suitable forms.

In FIG. 2, the extraction engine 228 is shown by way of example as being part of the field system 202. However, in other implementations, the extraction engine 228 may be provided in the server system 206, the remote system 204, or may be distributed among multiple portions of the system 200. Different advantages may be realized depending on the location of the extraction engine 228. For example, by providing the extraction engine 228 at the field system 202, the size of one or more data files representing the 3D model transmitted to the remote system 204 may be reduced as compared to the size of the initial 3D model of the environment before extraction. On the other hand, extraction of a target object from a 3D model of an environment can be a computationally expensive task, and in some instances may be more efficiently performed at the server system 206 or the remote system 204. Accordingly, extraction engine 228 can then be provided at either of the systems 204 or 206.

The field system 202 is configured to display virtual objects, such as virtual markers, within a view of an ambient environment provided by the HMD 214. The system 202 may insert into the view of the ambient environment virtual objects that were placed by a remote user, e.g., an expert user, at the remote system 204. Other virtual objects may be inserted into the view of the ambient environment by a local user, e.g., a field user at the field system 202. To display virtual objects, the field system 202 includes a virtual objects manager 220 and a rendering engine 222.

First, the virtual objects manager 220 maintains information about virtual objects that can be displayed within the view of the ambient environment. To display a virtual object that a remote user has specified, the field system 202 first receives via the communications interface 212 an instruction to display a virtual object at a specified position of the ambient field environment. The instruction can include values for various parameters that affect how the virtual object is to be displayed within the view of the ambient environment, including a display coordinate value, an object orientation value, a model identification value, secondary data values, or a combination of these and other values. The display coordinate value indicates the position in a 3D space at which the virtual object should be displayed. The object orientation value indicates the orientation at which the virtual object should be displayed (e.g., upright, horizontal, tilted). The model identification value indicates a particular visual representation that should be displayed for the virtual object. The virtual objects manager 220 may include a models database that maps a respective model identification value for each of a set of pre-stored 2D models (e.g., graphics or icons) or 3D models at the field system 202. Using a model identification value from the received instruction, the virtual objects manager 220 may access the models database to look-up which 2D or 3D model to display in the view of the ambient environment. Secondary data values can include any further information that affects how the virtual object should be presented to the user in the view of the ambient environment. As one example, the secondary data values may express a text label that is to be displayed next to the 2D or 3D model of the virtual object. As another example, the secondary data values may include a link to an external resource (e.g., a webpage or an application) or additional media content to render along with the 2D or 3D model of the virtual object.

As noted in the preceding paragraph, the field system 202 may include a display coordinate value that indicates the position in 3D space at which a virtual object should be displayed. One challenge that arises in this context is how to interpret the coordinate value so that the virtual object is displayed at the proper position within the view of the ambient environment, even if another user (e.g., a remote expert at the remote system 204) placed the virtual object in a 3D space for an environment that is different from the ambient environment of the field user. To this end, the virtual objects manager 220 may include an alignment and translation engine (not shown in FIG. 2) that is configured to translate a received display coordinate value to a translated display coordinate value that identifies the display position for a virtual object in a 3D space specifically for the ambient field environment. The received display coordinate value may be translated if, for example, the coordinate systems between the ambient field environment and a remote environment in which a remote user places a virtual object are not aligned. In other implementations, the alignment and translation engine may align the coordinate systems of the ambient field environment and the remote environment to obviate the need to translate a received display coordinate value. To align the coordinate systems, the spatial modeling engine 216 first identifies one or more anchor points in the ambient field environment. The anchor points serve as reference positions (e.g., origins) in a 3D coordinate system that defines spatial positions in the ambient field environment. For example, an anchor point may be located at the corner of a room in the ambient field environment and may be assigned the (0, 0, 0) origin position in a Cartesian coordinate system. The locations of objects in a 3D model of the ambient field environment can then be defined in terms of their offset from the origin position. Moreover, the field system 202 can transmit to the remote system 204 data that identifies the anchor points of the ambient field environment along with the 3D model of the ambient field environment or the 3D models of one or more target objects in the ambient field environment. In this way, the remote system 204 can identify the anchor points of the ambient field environment and can use the identified anchor points to generate display coordinate values for virtual objects in a remote environment in terms of their offsets from the identified anchor points. With the coordinate systems aligned between the field environment and the remote environment, coordinate values generated by either the field system 202 or remote system 204 will indicate corresponding positions in either environment. Thus, if a remote user places a virtual object at a particular location on a surface of a 3D model of a target object in a remote environment, the coordinate value that identifies the precise location of the virtual object in the remote environment will also identify an equivalent location on a surface of the actual target object that physically exists in the field environment.

The field system 202 further includes a rendering engine 222. The rendering engine 222 is configured to render virtual content for display using the HMD 214 or using an alternative display device. In some implementations, the rendering engine 222 augments a real-world view of an ambient environment by superimposing virtual objects over the view of the environment. The rendering engine 222 may process information from the spatial modeling engine 216 to determine values of parameters for displaying a virtual object such that the virtual object appears as if it is part of the ambient environment. For example, the virtual object may be placed on a surface of a physical object in the ambient environment. Using information from the spatial modeling engine 216, the rendering engine 222 can render the virtual object on the surface of the physical object within an augmented view of the ambient environment. Depending on the present field of view, the rendering engine 222 may render a virtual object to appear as if it is occluded by intervening physical objects and to appear that it is at a fixed spatial position in the 3D environment. The display parameter values for a virtual object indicate how the rendering engine 222 locates, sizes, and morphs a virtual object in real-time so as to create the illusion of the virtual object being located at a particular location of the ambient environment at a distance from the camera or the user's eyes.

An input manager 218 of the field system 202 is configured to receive user inputs from one or more input sources. The input sources may include any appropriate mechanism for detecting user inputs, e.g., mechanical buttons or switches, virtual buttons or switches, a camera and gesture recognizer, a microphone and speech recognizer, a mechanical or virtual keyboard, a pointing device, or a combination of two or more of these. A user may provide input to the field system 202 for various purposes such as to select a target object, to provide spoken or typed information to a remote user, to place or move virtual markers, to trigger a state capture event, or for other purposes. In some implementations, the input manager 218 is configured to receive and process data that indicates the direction of a gaze of a user wearing HMD 214. The direction of a user's gaze may be determined using data from one or more orientation and motion sensors of the HMD 214 (e.g., accelerometers, compasses, gyroscopes), from eye tracking sensors, or from both.

In some implementations, the field system 202 includes a state capture engine 224. The state capture engine 224 is configured to capture and store state data that indicates a state of the ambient field environment at particular times. In some instances, the state capture engine 224 captures and stores information that characterizes a field user's actions in the ambient field environment. For example, the system 202 may render a virtual marker within a view of the ambient field environment, where the marker was placed by a remote user in order to prompt the field user to operate on a specific component of a target object. When the field user brings a tool into position to begin work on the specified component, the state capture engine 224 may capture and store state data that identifies the position of the field user's tool in a 3D space of the ambient field environment (e.g., a position of the tool relative to the target object or the virtual marker). The state data may be transmitted to the remote system 204 for review of the field user's actions. In some examples, the remote system 204 uses the state data to render a virtual object that represents the field user's tool, such as a generic virtual marker or a 3D model of the tool, at a position in the remote environment that corresponds to the position in the field environment.

The field system 202, in some implementations, further includes one or more auxiliary data sources 226. The auxiliary data sources 226 make auxiliary data available to the field system 202. Auxiliary data can include any information that may bear on the field user's work in the field environment or that may bear on a remote user's assessment of the field environment. For example, the target object in a field environment may be equipped with sensors that generate signals indicating operating characteristics of the target object. The auxiliary data sources 226 may collect, store, and transmit the sensor signals indicative of operating characteristics of the target object to make such information available to the field system 202, the remote system 204, and/or the server system 206. In some implementations, data from the auxiliary data sources 206 is stored in the data store 208, which is directly accessible to the server system 206. In some implementations, raw auxiliary data or information derived at least in part from the raw auxiliary data may be presented to the field user, the remote user, or both. For example, during an electrical repair, the field user may attach the leads of a multi-meter to a target circuit board. As an auxiliary data source 226, electrical information such as current flow, voltage, or resistance may be collected, stored, and transmitted. The information may also be displayed to the field user, the remote user, or both while the repair is ongoing.

The remote system 204 may be implemented as one or more computers in one or more locations. In general, the remote system 204 is configured to present 3D models of at least a portion of the ambient field environment to a user that is remotely located from the field environment. The remote system 204 can add objects to a virtual field environment, such as virtual markers that identify specific locations in a 3D space of the virtual field environment. The virtual field environment can include a 3D model of the ambient field environment, or just a portion thereof such as a 3D model of a target object located in the ambient field environment.

The remote system 204 includes a controller 230. The controller 230 is responsible for managing operations of the remote system 204 and coordinating activities among the various other components 232-242 of the remote system 204. The communications interface 232 is configured to transmit and receive messages over one or more networks. The communications interface 232 allows the remote system 204 to communicate with the field system 202, the server system 206, or both.

A display device 234 displays the virtual field environment to a remote user, i.e., a user that may be local to the remote system 204 but that is located remotely from the field system 202. The remote system 204 may provide different types of display devices 234 for different user experiences. In some implementations, the display device 234 is a head-mounted display (HMD), e.g., like HMD 214 of the field system 202. An HMD can provide the user with a real-world view of the remote user's ambient environment while augmenting the view with the virtual field environment, e.g., by superimposing a 3D model of the target object from the field environment over the real-world view of the remote user's ambient environment. In some implementations, a mixed-reality HMD may superimpose the 3D model of the target object over a direct real-world view of the remote user's ambient environment, thereby allowing the remote user to view the 3D model at scale in the remote user's own environment. In other implementations, the display device 234 displays the virtual field environment on a 2D display screen such as an LCD or LED screen on a desktop monitor or a tablet computing device. The user may then, for example, use touchscreen gestures or other input mechanisms to manipulate (e.g., rotate, pan, zoom) the 3D model of the target object and to place virtual markers at specified positions of the virtual environment. In yet other implementations, the display device 234 displays the virtual field environment on a 3D display screen, e.g., a screen that uses stereoscopic imaging to create the illusion of depth. The 3D display screen may provide a more immersive experience for the remote user than a 2D display screen.

A rendering engine 236 of the remote system 204 is configured to render virtual objects that are displayed with the display device 234. The rendering engine 236 receives data characterizing a virtual environment (e.g., one or more virtual objects), renders the virtual environment in a 3D space, and outputs a signal to the display device 236 that can be used to display the rendered virtual environment.

A virtual objects manager 238 of the remote system 204 is configured to maintain information about virtual objects that can be displayed within the virtual environment. The virtual objects manager 238 may include a models database that maps a respective model identification value for each of a set of pre-stored 2D models (e.g., graphics or icons) or 3D models at the remote system 204. Using a model identification value, the virtual objects manager 238 may access the models database to look-up which 2D or 3D model to display in the view of the ambient environment. Secondary data values can include any further information that affects how the virtual object should be presented to the user in the view of the ambient environment. As one example, the secondary data values may express a text label that is to be displayed next to the 2D or 3D model of the virtual object. As another example, the secondary data values may include a link to an external resource (e.g., a webpage or an application) or additional media content to render along with the 2D or 3D model of the virtual object.

The remote system 204 includes a primary input manager 240 and a secondary input manager 242. The primary input manager 240 receives primary user inputs, i.e., user inputs that indicate a user's desire to add virtual markers to a virtual environment or manipulate virtual markers in a virtual environment. The secondary input manager 240 receives secondary user inputs, i.e., user inputs that indicate a user's desire to add secondary objects to a virtual environment. Secondary objects include objects other than virtual markers, such as objects that supplement virtual markers displayed in a virtual environment. For example, the remote user may add voice or text annotations to a virtual marker to provide additional explanation or clarification of tasks that the field user is requested to perform.

In some implementations, the primary input manager 240, the secondary input manager 242, or both, are configured to receive user inputs from one or more input sources. The input sources may include any appropriate mechanism for detecting user inputs, e.g., mechanical buttons or switches, virtual buttons or switches, a camera and gesture recognizer, a microphone and speech recognizer, a mechanical or virtual keyboard, a pointing device, or a combination of two or more of these. A user may provide input to the remote system 204 for various purposes such as to select a target object, to provide spoken or typed information to a field user, to place or move virtual markers, or for other purposes. In some implementations, the input manager 242 is configured to receive and process data that indicates the direction of a gaze of a user wearing a head-mounted display device. The direction of a user's gaze may be determined using data from one or more orientation and motion sensors of the HMD (e.g., accelerometers, compasses, gyroscopes), from eye tracking sensors, or from both.

Figure 3A:
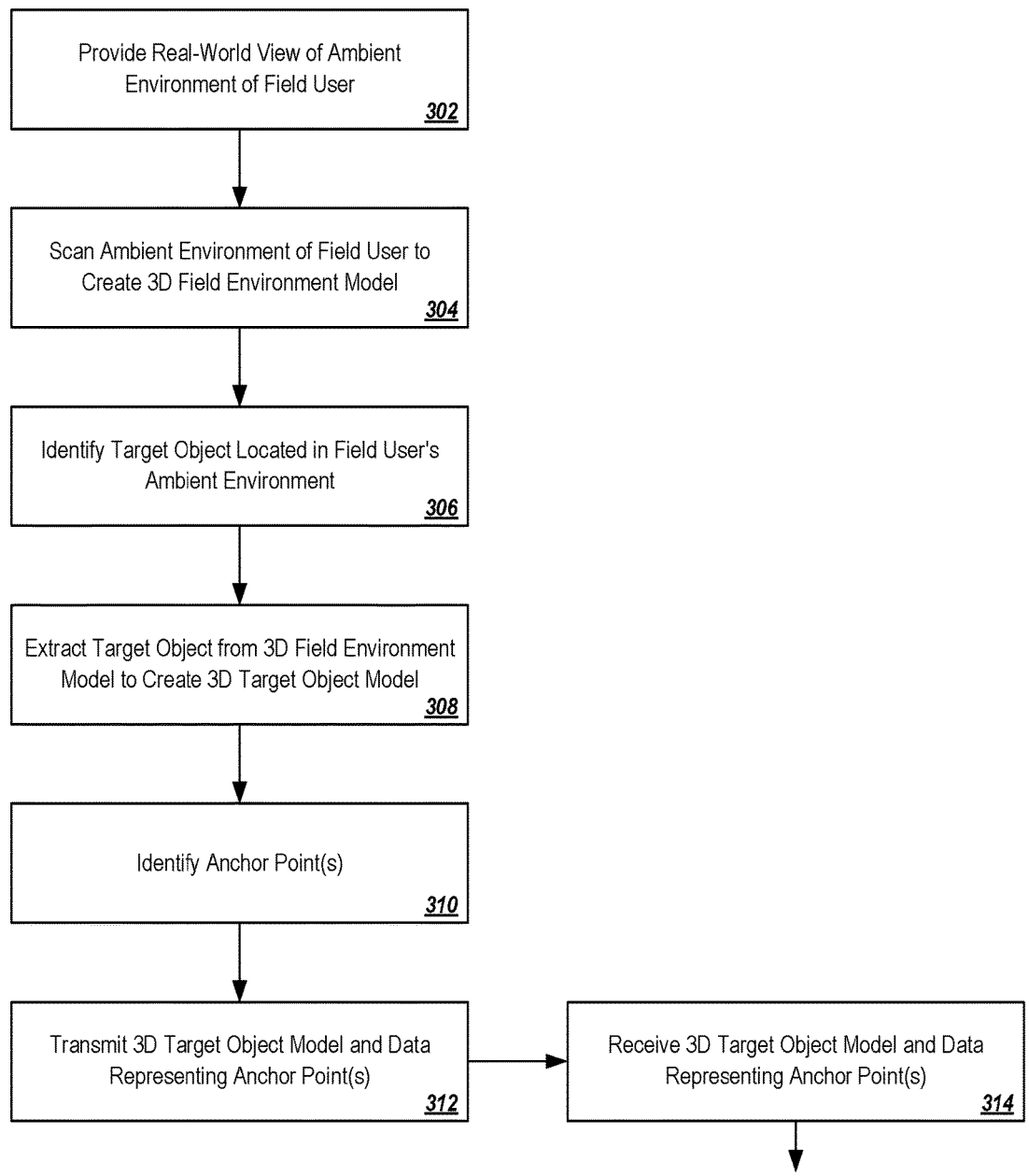
FIGS. 3A-3C provide a flowchart of an example process for placing and rendering virtual markers in remotely located environments.
Figure 3B:
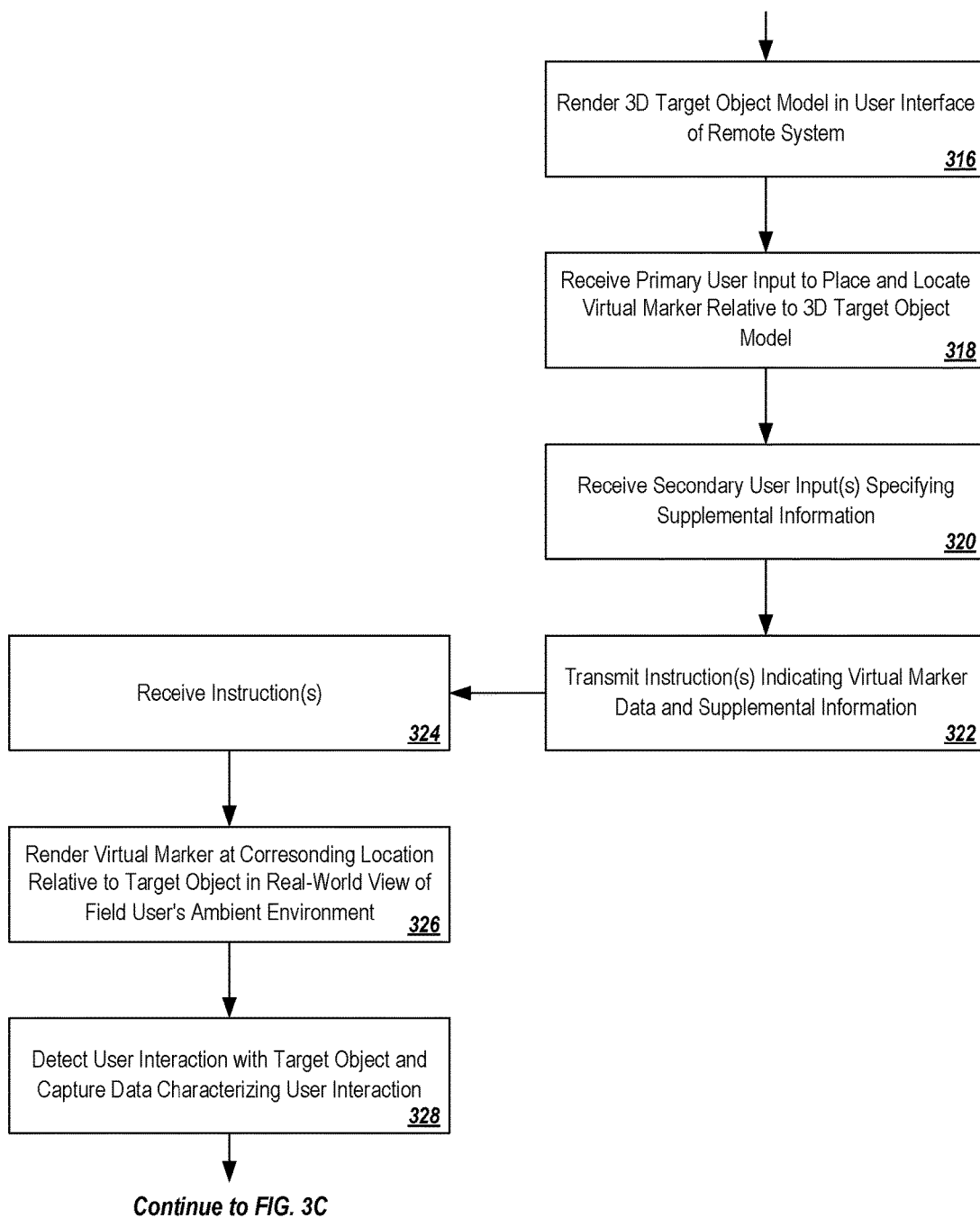
Figure 3C:
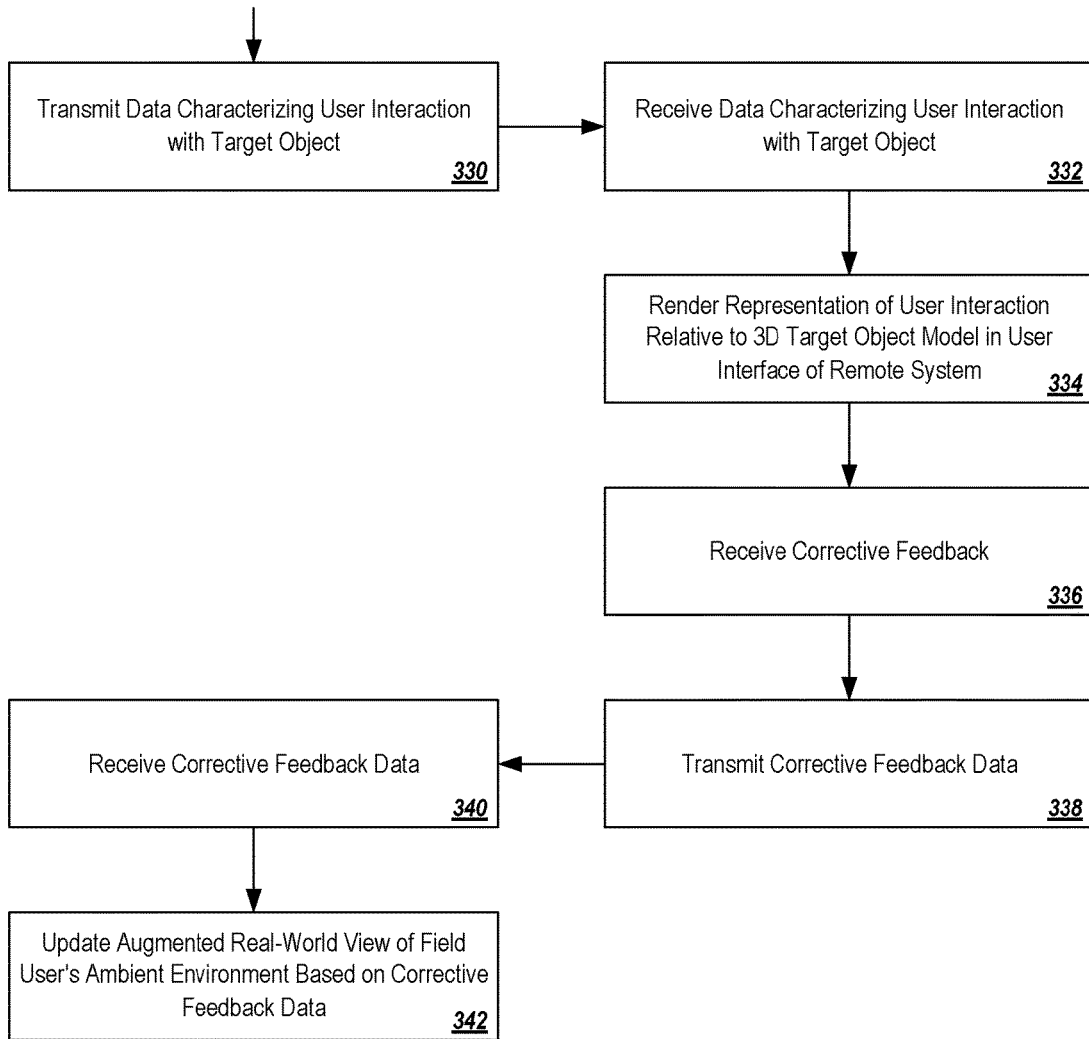

Referring next to FIGS. 3A-3C, a flowchart is depicted of an example process 300 for placing and rendering virtual markers in a 3D environment. The process 300 can be carried out by a system of computers in two or more locations, e.g., the remote modeling system 200 of FIG. 2. The flowchart is shown as a series of operations performed between a field portion of the computing system, e.g., field system 202, and a remote portion of the computing system, e.g., remote system 204. However, in some implementations, the operations may not all be performed directly between the field system and remote system. The field system and the remote system may communicate through an intermediate server system, e.g., server system 206, and particular ones of the operations 302-342 may alternatively be performed at the intermediate server system rather than the field system or the remote system.

The process 300 begins at stage 302 where the field system provides a real-world view of an ambient environment of a user in the field. The ambient environment may be directly viewed through lenses of a head-mounted display, e.g., head-mounted display 214, or may be indirectly viewed on an electronic display screen that shows images or video of the ambient environment.

At stage 304, the field system scans the ambient environment of the user in the field to create a 3D model of at least a portion of the ambient field environment. The scan may be performed using spatial sensors such as a depth camera, a radio detection and ranging subsystem (RADAR), a sound navigation and ranging subsystem (SONAR), a light detection and ranging subsystem (LIDAR), or a combination of these or other scanning techniques. A spatial modeling engine, e.g., spatial modeling engine 216, may process the spatial sensing data to generate the 3D model.

At stage 306, the field system identifies a target object located in the ambient field environment. In some implementations, the system identifies the target object automatically (e.g., without receiving user input between scanning the environment and identifying the target object). In some implementations, the system identifies the target object based on user input. For example, the system may prompt a user to select the target object from an image or video of the ambient field environment or by selecting a portion of the 3D model of the field environment corresponding to the desired target object.

At stage 308, the field system extracts the identified target object from the 3D model of the at least the portion of the ambient field environment. The field system may include an extraction engine, e.g., extraction engine 228, to generate a 3D model of the target object from the 3D model of the ambient field environment by extracting the target object from other portions of the ambient field environment contained in the 3D model. In some implementations, extraction of the 3D target object model may be performed at an intermediary server system or at the remote system, rather than at the field system.

At stage 310, the field system identifies one or more anchor points in a 3D space for the ambient field environment. The anchor points can be used to align coordinate systems between the field system and the remote system, which thereby allows virtual objects to be placed in a virtual field environment and subsequently rendered at an equivalent position in a real-world view of the same environment. In some implementations, the system designates one, two, three, or more positions in the 3D model of the target object (or the 3D model of the at least the portion of the ambient environment if extraction has not yet occurred) as anchor points. The anchor points can be chosen arbitrarily or based on logic that optimizes the selection of particular positions as anchor points.

At stage 312, the field system transmits the 3D model of the target object (or the 3D model of the at least the portion of the ambient environment if extraction has not yet occurred) to the remote system. In some implementations, the 3D model is transmitted over a network directly to the remote system. In other implementations, the 3D model is transmitted indirectly over the network to the remote system.

At stage 314, the remote system receives the 3D model of the target object from the field system.

Upon receiving the 3D model of the target object, the system renders the model in a user interface of the remote system. The user interface of the remote can take various forms depending on user preferences and the display hardware on which the rendered model is displayed. The user interface can be a virtual representation of the ambient field environment. A rendering engine of the remote system, e.g., rendering engine 236, may render the 3D model of the target object, and the rendered model may be displayed using a display device, e.g., display device 234.

At stage 318, the remote system receives a primary user input to place a virtual marker in the user interface of the remote system. In particular, the virtual marker may be placed in a virtual field environment on or around a 3D model of the target object or a 3D model of at least a portion of the ambient field environment. The location of the marker in the virtual field environment may be specified by a coordinate value in a 3D coordinate system, where the coordinate value identifies an offset of the specified location of the marker in 3D space from one or more anchor points. The primary user input may also specify other characteristics of the virtual marker such as an orientation of the marker, a size of the marker, a 2D icon or 3D model for the marker, or a combination of these.

At stage 320, the remote system optionally receives a secondary user input that identifies supplemental information the remote user desires to share with the field user. The supplemental information can include a range of content of any suitable type that the field system is capable of rendering for presentation to the field user. For example, the remote user may type or dictate text containing instructions for performing a task, or may send an audio recording, a hyperlink, or a video to the field user as supplemental information.

At stage 322, the remote system transmits an instruction to the field system. The instruction carries data that, when processed by the field system, is to cause the field system to augment a view of the ambient field environment with virtual markers specified by the remote user. The instruction can include a display coordinate value and, optionally, other data that characterizes the primary user input and any secondary user input so that virtual markers and supplemental information can be presented to the field user according to the received inputs. The remote system uses a communications interface, e.g., communications interface 232 to transmit the instruction to the field system.

At stage 324, the field system receives the instruction from the remote system. The instruction can be received over a network using a communications interface at the field system, e.g., communications interface 312.

At stage 326, the field system processes the received instruction and, based on the instruction, renders a virtual marker in an augmented view of the ambient environment of the field user. A rendering engine, e.g., rendering engine 222, can render the virtual marker at a position in the ambient field environment that the display coordinate value indicates from the received instruction. The rendered virtual marker is displayed using a display device, e.g., HMD 214. The rendering engine may also render visual representations of any supplemental information that the remote user provided as secondary input to the remote system.

At stage 328, the field system identifies a user interaction with the target object in the field environment. In some implementations, the system may monitor for any user actions to occur within a region of the field environment that is located within a threshold distance of the virtual marker rendered in the view of the ambient field environment. Upon detecting the occurrence of one or more pre-defined events within this region of the field environment, a state capture engine, e.g., state capture engine 224, may capture and store state data that characterizes a current condition of the field system, the field environment generally, the target object specifically, or a combination of these. For example, the state capture engine may automatically capture and store data pertaining to a tool that is applied to perform a given task on the target object. For a wrench that is used to repair a pipe, for instance, the state capture engine may record the location where the wrench contacted the pipe to remove a broken valve or coupling as identified by a virtual marker, and may record characteristics with respect to how the wrench was used such as its orientation, number of turns, and applied level of torque.

At stage 330, the field system uses a communications interface, e.g., communications interface 312 to transmit data characterizing the captured and stored state data to the remote system. At stage 332, the remote system receives the state data from the field system using a communications interface, e.g., communications interface 232.

At stage 334, the remote system uses the state data to render a virtual representation of the field user's interaction with the target object in the user interface of the remote system. The virtual representation of the field user's interaction can be displayed in a virtual field environment at the remote system along with a display of the 3D model of the target object, or a 3D model of the field environment more generally if the target object has not been extracted. Additionally, the virtual representation of the field user's interaction can be displayed concurrently with the virtual marker that the remote user had placed in the virtual field environment at stage 318. For example, a second virtual marker representing the location in the ambient field environment where the field user applied a tool to the target object can be displayed in the virtual field environment along with the first virtual marker placed by the remote user. The concurrent display of both virtual markers provides a visual comparison to the remote user of the desired location for the field user's work, as indicated by the first virtual marker, and the actual location of the field user's work, as indicated by the second virtual marker. By seeing the two virtual markers at once, the remote user can then make a decision whether the field user's work is acceptable or if corrective action should be taken. In some implementations, the remote system may generate an alert for the remote user if the respective positions of the virtual markers are greater than a threshold distance apart. The remote system may also generate an alert if other aspects of the field user's work does not match with a parameter that the remote user prescribed for the work. For example, if the user torqued the wrench in the wrong direction or applied a tool in a mode that differs from a mode prescribed by the remote user, then the system may generate an alert to notify the remote user of the fact.

At stage 336, the remote system may receive corrective feedback from the remote user if the remote user judges that the field user's work should be corrected in some manner. Corrective feedback may be received if the field user's work did not match location or other prescribed parameters for the work indicated by the remote user. In other instances, corrective feedback may be received if the field user properly carried out the remote user's instruction, but the action did not achieve a desired result. In some implementations, the remote system receives corrective feedback via an input manager, e.g., primary input manager 240 or secondary input manager 242. For example, if the remote user intends to convey to the field user that the location of the field user's application of a tool in an ambient environment should be adjusted, then the remote user may specify a change in the location of the first or second virtual markers. In another example, the remote user may add annotations to existing virtual markers or create new virtual markers to indicate corrective feedback to the field user.

At stage 338, the remote system transmits data characterizing the remote user's corrective feedback to the field system using a communications interface, e.g., communications interface 232. At stage 340, the field system receives the data characterizing the remote user's feedback using a communications interface, e.g., communications interface 212. In response to having received the corrective feedback data, at stage 342 the field system updates the augmented real-world view of the ambient field environment. For example, the field system may move a virtual marker to a different position in the 3D space of the ambient field environment based on the corrective feedback data. In some implementations, the virtual marker may be ghosted in the original position, while the fully textured virtual marker (non-ghosted) is displayed in the updated position.

FIGS. 4A-4D illustrate an example physical control object 402 that can be employed in augmented and mixed reality systems to provide efficient access to user interface elements that are superimposed in a view of a real-world environment. Some computing systems do not provide robust hand-based input controls such as a mouse or a keyboard, or users may not prefer to use conventional hand-based input controls. For example, in mixed-reality or virtual reality environments, a user may wear a head-mounted display (HMD) that provides a direct or indirect real-world view of the user's ambient environment. The user may wish to keep his or her hands free to perform other tasks in the environment and conventional hand-based input controls (e.g., a mouse or a keyboard) may be impractical for use with the HMD. The techniques described with respect to FIGS. 4A-4D may advantageously allow a user to navigate through sophisticated user interface menus and other elements in a user interface (e.g., a real-world view of an ambient environment) in a natural and efficient manner.

FIG. 4A depicts a physical control object as a cube 402. Other geometries may also be suitable for a physical control object such as a tetrahedron, a square pyramid, a hexagonal pyramid, a cuboid, a triangular prism, an octahedron, a pentagonal prism, a hexagonal prism, a dodecahedron, or an icosahedron. The cube 402 includes six faces, three of which are explicitly shown in FIG. 4A. Respective symbols 406a-c are uniquely printed on each of the faces. For example, the first face of the cube 402 includes a circle symbol 406a while the second face of the cube 402 includes a triangular symbol 406b. The cube 402 is located within the field of view of a camera 404. The camera 404 may, for example, be an RGB video camera on a head-mounted display such that the cube 402 is in the camera's field of view when the user turns his or her head to gaze at the cube 402.

While the cube 402 is in the field of view of the camera 404, a computing system coupled to the camera 404, e.g., field system 202 or remote system 204, may use computer vision techniques to recognize the cube 402 as a physical control object, and to render virtual display elements over a particular surface of the cube 402, all surfaces of the cube 402, or only some surfaces of the cube 402. For example, an augmented view 408a of the cube 402 is shown in which a first virtual display element 410a is rendered over the first face of the cube 402, a second virtual display element 410b is rendered over the second face of the cube 402, and a third virtual display element 410c is rendered over the third face of the cube 402. The virtual display elements may wholly or partially mask a view of the actual contents of the respective faces of the cube 402. For instance, a virtual display element may be rendered in an augmented real-world view of the ambient environment by superimposing the virtual display element over a corresponding face of the cube 402 to texturize the face.

In some implementations, a virtual display element provides a user interface control with which a user may interact by manipulating the control object, e.g., cube 402. For example, FIG. 4C shows a circular dial 412 as a virtual display element that has been rendered over the second face of the cube. The system may select to render the dial 412 over the second face of the cube 402, and to not render virtual display elements over other faces of the cube 402, based on identifying that the second face of the cube 402 is oriented in a predetermined direction, e.g., in the direction of the camera 404. A user may rotate the dial 412 to perform an action with the computing system by rotating the cube 402 while maintaining the second face of the cube 402 in the orientation toward camera 404. The dial 412 may be fixed relative to the cube 402 so that it follows the cube 402 as it moves within the field of view of the camera.

In some implementations, a user may activate different virtual display elements by rotating the cube 402 to orient different faces of the cube toward the camera 404. For example, FIG. 4D shows that the system may render a menu 414, rather than a dial 412, when the cube 402 is rotated such that the first face is oriented toward the camera 404.

Figure 5:
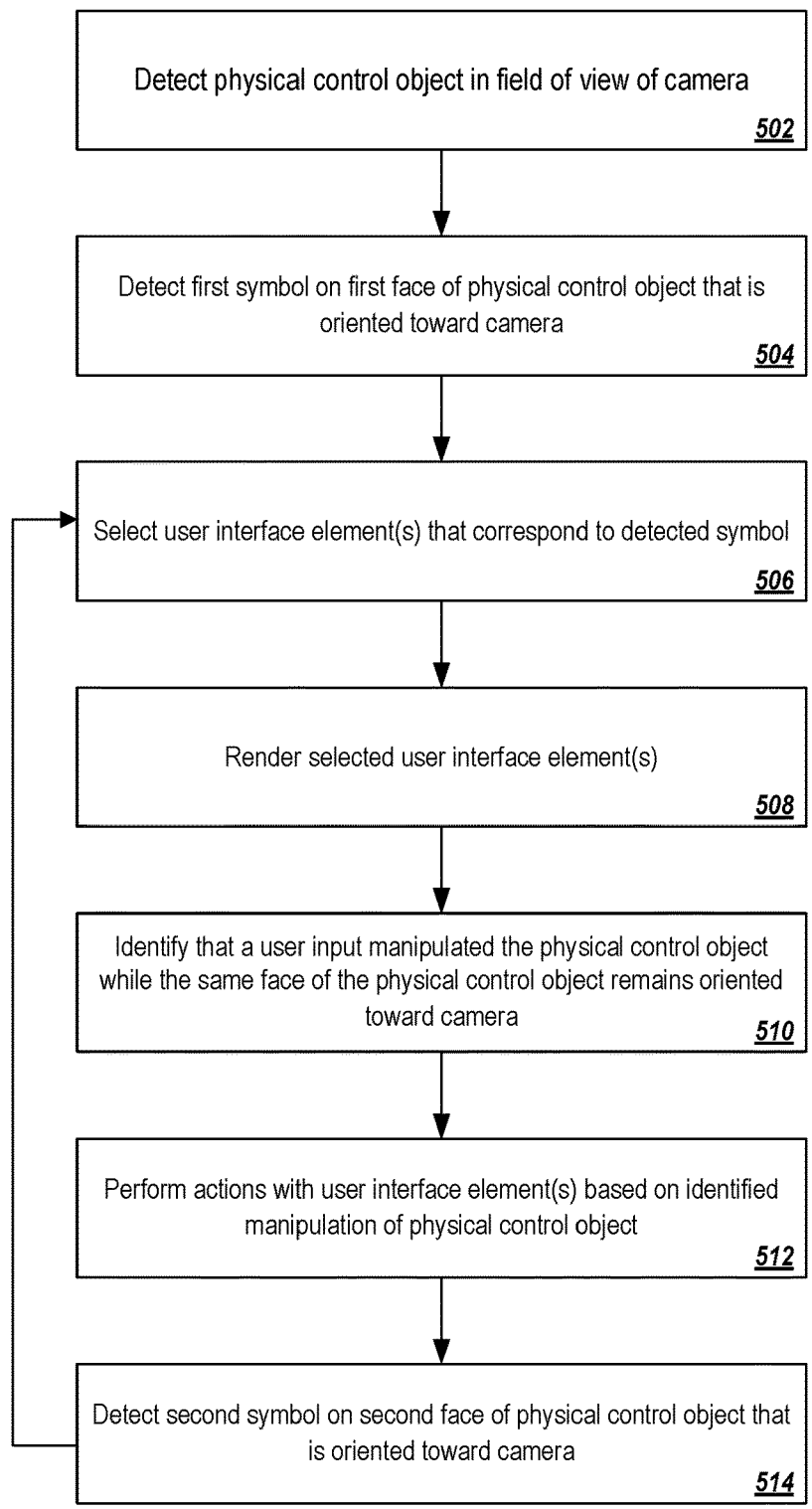
FIG. 5 is a flowchart of an example process for monitoring user interactions with a physical control object and providing access to user interface elements according to the user interactions.

FIG. 5 is a flowchart of an example process 500 that for rendering virtual display elements within a user interface based on actions performed with a physical control object, e.g., cube 402, in the field of view of a camera. In some implementations, the process 500 is carried out by a system of one or more computers in one or more locations, e.g., field system 202 or remote system 204. At stage 502, the system detects a physical control object within the field of view of the camera. The physical control object may have a geometric shape with multiple sides a respective symbol printed on each side. At stage 504, the system analyzes images or video of the physical control object to detect a first symbol on a face of the physical control object that is oriented toward the camera. The system may include a database that maps each of a set of virtual display elements to one or more symbols printed on the physical control object. At stage 506, based on detecting the first symbol on the face of the physical control object that is oriented toward the camera, the system selects a virtual display element that is mapped to the first symbol. At stage 508, the system renders the selected virtual display element in a view of an environment that includes the physical control object. The virtual display element is rendered at least partially over a face of the physical control object that is oriented toward the camera. At stage 510, the system identifies that a user input manipulated the physical control object while face having the first symbol remains oriented toward the camera. For example, the user may rotate, shake, or tap on the first face of the control object. The system is configured to detect the user's interaction with the control object by analyzing images or video of the control object using computer vision techniques. At stage 512, the system performs an operation associated with the virtual display element based on the identified user interaction. For example, if the user tilts the control object forward, the system may respond by scrolling down a list of items provided in the virtual display element. If the user then shakes or taps the display element, one of the items that has focus in the list of items may be selected. In some implementations, the user may activate a different virtual display element by rotating the physical control object to orient a second face of the object toward the camera. At stage 514, the system detects a second symbol on the second face of the physical control object. The system then returns to stage 506 for continued processing based on the second face of the control object being oriented toward the camera.

FIGS. 6A-6D illustrate techniques for interacting with a gaze-activated user interface element 606 in augmented views 602*a-d* of a real-world environment. When viewing an environment through a head-mounted display, the amount of viewing area that can be augmented with user interface elements (virtual display elements) is sometimes restricted by physical constraints of the HMD. Additionally, user interface elements can sometimes distract from the ability of a user to focus on a view of the real-world environment that the HMD provides. The techniques illustrated in FIGS. 6A-6D may advantageously, in some implementations, at least partially address these challenges in presenting user interface elements in virtual or mixed reality using a HMD.

Figure 6A:
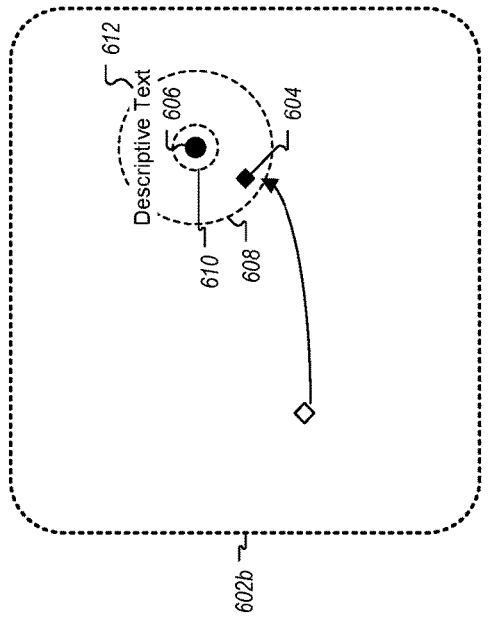
FIGS. 6A-6D illustrate techniques for interacting with a gaze-activated user interface element in an augmented view of a real-world environment.
Figure 6B:
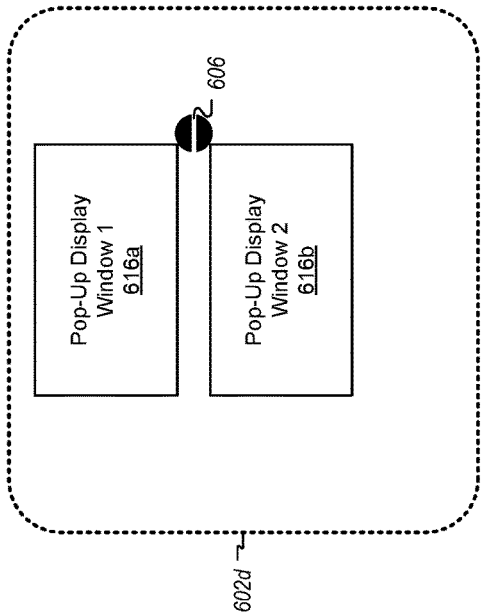
Figure 6C:
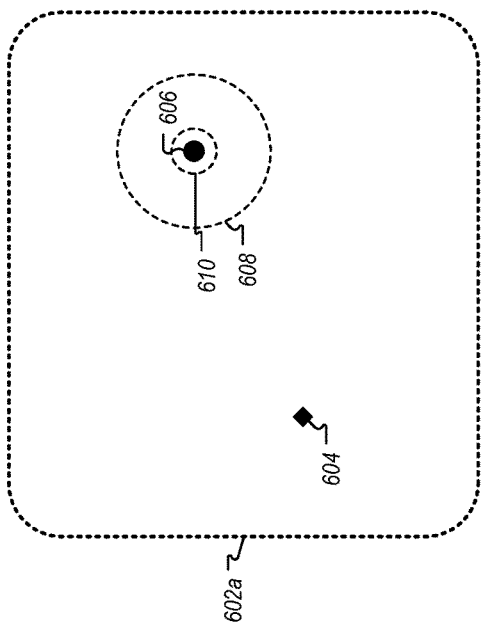

FIG. 6A depicts an annotated view 602*a* of an environment presented to a user through a HMD, e.g., HMD 214. The environment may be a real-world or virtual environment. A gaze-activated user interface element 606 is presented in the environment. The element 606 may be rather small, e.g., 5-10 pixels in width and height, and may occupy a small portion of the total viewing area that is capable of being augmented with virtual objects. The HMD may include sensors, e.g., orientation and motion sensors and/or eye-tracking sensors that sense the direction of a user's gaze while wearing the HMD 214. The point of focus of the user's gaze, i.e., the point where the user's gaze is currently directed, is represented by the reticle 604. As the user moves his or her eyes, or head, the position of the reticle in the view 602*a* changes to indicate the updated direction of the user's gaze.

In some implementations, to minimize the distraction of the element 606, the HMD displays the element 606 fully or partially transparently while the user's gaze is not in proximity of the element 606. As the focus of the user's gaze becomes closer to the element 606, the transparency of the element 606 may gradually decrease. Other aspects of the visual appearance of the element 606 may also change as a function of the distance between the reticle 604 and the element 606, e.g., color, size, shape, or a combination of these.

In some implementations, the system defines one or more action thresholds around the user-interface element 606. For example, FIG. 6A shows a first action threshold 608 at a first distance from the center of element 606 and a second action threshold 610 a second, shorter distance from the center of element 606. As the focus of the user's gaze crosses an action threshold, the system performs a particular action that has been mapped to the threshold. In some instances, the actions may include expanding the element 606 or providing additional descriptive detail about the element 606. For example, in FIG. 6B, the system displays pop-up descriptive text 612 near the element 606 when the user's gaze crosses the first action threshold 608. Then, as the user focuses more specifically on the element 606 and the focus of the user's gaze becomes less than a distance from element 606 indicated by the second action threshold 610, the system may display a pop-up display window 614, as shown in the view 602*c* of FIG. 6C. The pop-up display window 614 may provide media content, textual content, or additional user interface elements such as a list of interactive items organized as a menu.

Figure 6D:
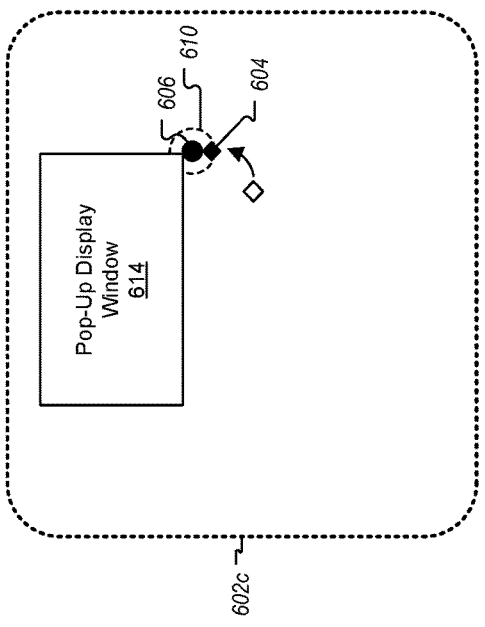

In some implementations, a gaze-activated user interface element 606 may be divided into several portions. For example, FIG. 6D illustrates view 602*d* of an environment in which the gaze-activated element 606 is divided into a top half and a bottom half. As the user's gaze focuses on the top half of the element 606, a first pop-up display window 616*a* appears. In response to detecting that the user's gaze is focused on the bottom half of the element 606, a second pop-up display window 616*b* appears.

Figure 7:
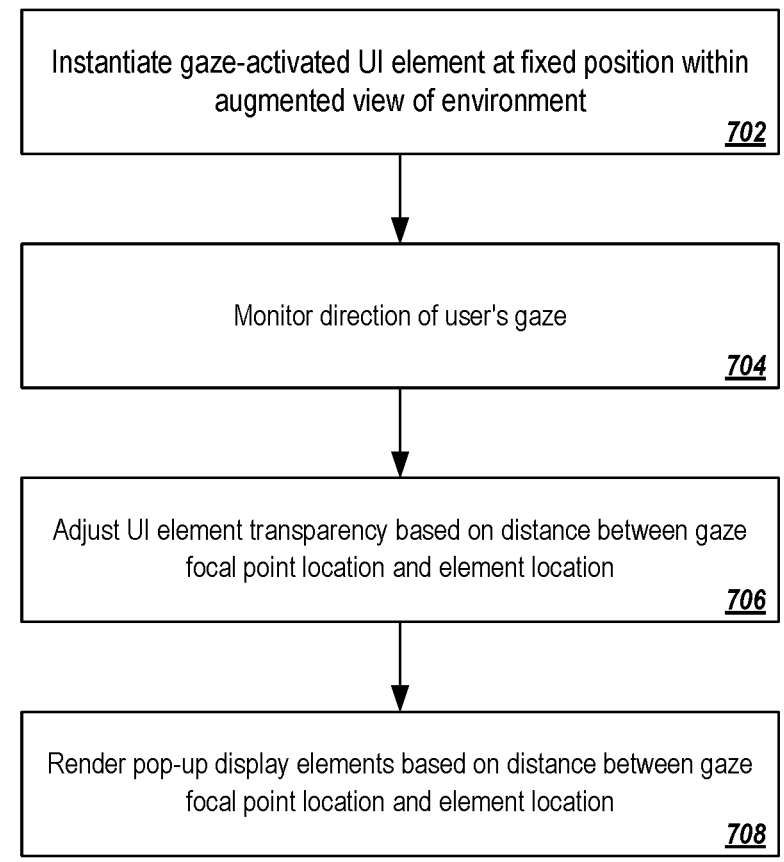
FIG. 7 is a flowchart of an example process for monitoring and responding to user interactions with a gaze-activated user interface element.

FIG. 7 is a flowchart of an example process 700 for interacting with a gaze-activated user interface element. The process 700 may be carried out by one or more computers in one or more locations, e.g., field system 202 or remote system 204 using a head-mounted display 214.

At stage 702, the system instantiates a gaze-activated user interface element, e.g., element 606, within an augmented view of an environment. For example, the element may be an icon or other relatively small virtual marker that is fixed at a position in 3D space of an ambient environment seen through lenses of a screen of a HMD. The element may be fully or partially transparent when the focus of a user's gaze is more than a threshold distance from the gaze-activated user interface element.

At stage 704, the system monitors the direction of the user's gaze as the user views the environment using the HMD. The system may determine the direction of the user's gaze using orientation and motion sensing data from sensors on the HMD of the user such as eye tracking sensors, accelerometers, compasses, gyroscopes, or a combination of two or more of these. In some implementations, the system can display a reticle (e.g., a small dot or cross-hairs) in the view of the environment that precisely identifies the calculated direction of the user's gaze.

At stage 706, the system adjusts the transparency of the gaze-activated user interface element based on a distance between a focal point of the user's gaze (e.g., as indicated by a reticle) and the location of the element. In some implementations, the element becomes increasingly opaque as the distance between the focal point of the user's gaze and the location of the element decreases.

At stage 708, the system detects that the focal point of the user's gaze is less than a threshold distance from the location of the gaze-activated user-interface element. In response, the system performs a prescribed action such as generating and rendering a pop-up display element within the view of the environment. For example, the gaze-activated user-interface element may expand to show additional detailed information about a topic when the user's gaze becomes fixed on the element.

FIG. 8 is a schematic diagram of a computer system 800. The system 800 can be used to carry out the operations described in association with any of the computer-implemented methods, systems, devices, and other techniques described previously, according to some implementations. The system 800 is intended to include various forms of digital computers, such as laptops, desktops, workstations, personal digital assistants, servers, blade servers, mainframes, and other appropriate computers. The system 800 can also include mobile devices, such as personal digital assistants, cellular telephones, smartphones, and other similar computing devices. Additionally, the system can include portable storage media, such as, Universal Serial Bus (USB) flash drives. For example, the USB flash drives may store operating systems and other applications. The USB flash drives can include input/output components, such as a wireless transmitter or USB connector that may be inserted into a USB port of another computing device.

The system 800 includes a processor 810, a memory 820, a storage device 830, and an input/output device 840. Each of the components 810, 820, 830, and 840 are interconnected using a system bus 850. The processor 810 is capable of processing instructions for execution within the system 800. The processor may be designed using any of a number of architectures. For example, the processor 810 may be a CISC (Complex Instruction Set Computers) processor, a RISC (Reduced Instruction Set Computer) processor, or a MISC (Minimal Instruction Set Computer) processor.

In some implementations, the processor 810 is a single-threaded processor. In another implementation, the processor 810 is a multi-threaded processor. The processor 810 is capable of processing instructions stored in the memory 820 or on the storage device 830 to display graphical information for a user interface on the input/output device 840.

The memory 820 stores information within the system 800. In one implementation, the memory 820 is a computer-readable medium. In one implementation, the memory 820 is a volatile memory unit. In another implementation, the memory 820 is a non-volatile memory unit.

The storage device 830 is capable of providing mass storage for the system 800. In one implementation, the storage device 830 is a computer-readable medium. In various different implementations, the storage device 830 may be a floppy disk device, a hard disk device, an optical disk device, or a tape device.

The input/output device 840 provides input/output operations for the system 800. In one implementation, the input/output device 840 includes a keyboard and/or pointing device. In another implementation, the input/output device 840 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier, e.g., in a machine-readable storage device for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer. Additionally, such activities can be implemented via touch-screen flat-panel displays and other appropriate mechanisms.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include a local area network ("LAN"), a wide area network ("WAN"), peer-to-peer networks (having ad-hoc or static members), grid computing infrastructures, and the Internet.

The computer system can include clients and servers. A client and server are generally remote from each other and typically interact through a network, such as the described one. The relationship of client and server arises by virtue of computer programs running on the respective computers and having a client-server relationship to each other.

While this specification contains many specific implementation details, these should not be construed as limitations on the scope of any inventions or of what may be claimed, but rather as descriptions of features specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A computer-implemented method, comprising:
   detecting, by a computing system, a physical control object shown in a field of view of a camera;
   identifying, by the computing system, a first symbol provided on a first side of the physical control object, wherein the physical control object includes a plurality of sides;
   augmenting a display of the physical control object in an augmented-reality environment by overlaying a first virtual user interface element on the first side of the physical control object,
      wherein the computing system selects to overlay the first virtual user interface element on the first side of the physical control object rather than the other ones of the plurality of sides of the physical control object based on the computing system having identified the first symbol on the first side of the physical control object,
      wherein the first virtual user interface element that is overlaid on the first side of the physical control object where the first symbol is provided comprises a menu having a plurality of scrollable items;
   identifying, by the computing system, a user action to manipulate the physical control object; and
   performing an operation with the computing system based on the identified user action to manipulate the physical control object, the operation including animating the menu of the first virtual user interface element to scroll the plurality of scrollable items.

2. The computer-implemented method of claim 1, wherein the physical control object is shaped as a cube, a tetrahedron, a square pyramid, a hexagonal pyramid, a cuboid, a triangular prism, an octahedron, a pentagonal prism, a hexagonal prism, a dodecahedron, or an icosahedron.

3. The computer-implemented method of claim 1, wherein augmenting the display of the physical control object comprises rendering the first virtual user interface element on the first side of the physical control object as shown in a direct or indirect real-world view of the augmented-reality environment of the physical control object.

4. The computer-implemented method of claim 3, wherein augmenting the display of the physical control object comprises rendering the first virtual user interface element on the first side of the physical control object as shown in a direct real-world view of the augmented-reality environment through a head-mounted display.

5. The computer-implemented method of claim 4, wherein the camera is provided on the head-mounted display.

6. The computer-implemented method of claim 3, wherein augmenting the display of the physical control object comprises rendering the first virtual user interface element on the first side of the physical control object as shown in an indirect real-world view of the augmented-reality environment through a video feed.

7. The computer-implemented method of claim 1, wherein identifying the user action to manipulate the physical control object comprises identifying that the user action acted to manipulate the physical control object by at least one of rotating, shaking, or tapping the physical control object.

8. The computer-implemented method of claim 1, wherein identifying the first symbol shown on the first side of the physical control object comprises determining that the first side of the physical control object is oriented toward the camera, and in response, performing a recognition process on the first side of the physical control object to recognize the first symbol.

9. The computer-implemented method of claim 1, further comprising selecting the first virtual user interface element to overlay on the first side of the physical control object based on a stored association between the first virtual user interface element and the first symbol that was identified as being shown on the first side of the physical control object.

10. The computer-implemented method of claim 1, wherein different ones of the plurality of sides of the physical control object are marked with different ones of a plurality of symbols, and each symbol is associated with a different virtual user interface element or a different operation that can be performed when a user action manipulates the physical control object while the symbol is oriented toward the camera.

11. The computer-implemented method of claim 1, further comprising:
   identifying that a second user action has rotated the physical control object from a first orientation in which the first side of the physical control object faces the camera to a second orientation in which a second side of the physical control object faces the camera; and
   in response to identifying that the second user action has rotated the physical control object from the first orientation to the second orientation:
      identifying a second symbol shown on the second side of the physical control object; and augmenting a display of the physical control object in the augmented-reality environment by overlaying a second virtual user interface element on the second side of the physical control object, the second virtual user interface element corresponding to the second symbol.

12. The computer-implemented method of claim 1, wherein the user action to manipulate the physical control object is identified while the computing system continues to augment the display of the physical control object in the augmented-reality environment by overlaying the first virtual user interface element on the first side of the physical control object.

13. The computer-implemented method of claim 1, wherein overlaying the first virtual user interface element on the first side of the physical control object rather than the other ones of the plurality of sides of the physical control object comprises aligning a plane of the first virtual user interface element with respect to a plane of the first side of the physical control object rather than with respect to planes of the other ones of the plurality of sides of the physical control object.

14. The computer-implemented method of claim 13, wherein the first virtual user interface element extends beyond the edges of the first side of the physical control object when the first virtual user interface element is overlaid on the first side of the physical control object.

15. The computer-implemented method of claim 1, wherein the user action to manipulate the physical control object comprises tilting the physical control object forward, and animating the menu of the first virtual user interface element based on the identified user action comprises scrolling the plurality of scrollable items in a direction corresponding to the tilting of the physical control object.

16. The computer-implemented method of claim 1, further comprising:
   identifying, by the computing system, a second user action to manipulate the physical control object, the second user action including shaking or tapping the physical control object; and
   performing a second operation with the computing system based on the second user action to manipulate the physical control object, the second operation including selecting one of the plurality of scrollable items presented in the menu of the first virtual user interface element.

17. A computing system, comprising:
one or more processors; and
one or more non-transitory computer-readable media encoded with instructions that, when executed by the one or more processors, cause the one or more processors to perform operations comprising:
   identifying a first symbol provided on a first side of a physical control object, wherein the physical control object includes a plurality of sides;
   augmenting a display of the physical control object in an augmented-reality environment by overlaying a first virtual user interface element on the first side of the physical control object,
      wherein the computing system selects to overlay the first virtual user interface element on the first side of the physical control object rather than the other ones of the plurality of sides of the physical control object based on the computing system having identified the first symbol on the first side of the physical control object,
      wherein the first virtual user interface element that is overlaid on the first side of the physical control object where the first symbol is provided comprises a menu having a plurality of scrollable items;
   identifying a user action to manipulate the physical control object; and
   performing an operation with the computing system based on the identified user action to manipulate the physical control object, the operation including animating the menu of the first virtual user interface element to scroll the plurality of scrollable items.

18. One or more non-transitory computer-readable media having instructions encoded thereon that, when executed by one or more processors of a computing system, cause the one or more processors to perform operations comprising:
   detecting, by the computing system, a physical control object shown in a field of view of a camera;
   identifying, by the computing system, a first symbol provided on a first side of the physical control object, wherein the physical control object includes a plurality of sides;
   augmenting a display of the physical control object in an augmented-reality environment by overlaying a first virtual user interface element on the first side of the physical control object,
      wherein the computing system selects to overlay the first virtual user interface element on the first side of the physical control object rather than the other ones of the plurality of sides of the physical control object based on the computing system having identified the first symbol on the first side of the physical control object,
      wherein the first virtual user interface element that is overlaid on the first side of the physical control object where the first symbol is provided comprises a menu having a plurality of scrollable items;
   identifying, by the computing system, a user action to manipulate the physical control object; and
   performing an operation with the computing system based on the identified user action to manipulate the physical control object, the operation including animating the menu of the first virtual user interface element to scroll the plurality of scrollable items.

* * * * *